US006952806B1

(12) United States Patent
Card et al.

(10) Patent No.: US 6,952,806 B1
(45) Date of Patent: Oct. 4, 2005

(54) MEDIUM CONTAINING INFORMATION GATHERED FROM MATERIAL INCLUDING A SOURCE AND INTERFACE FOR GRAPHICALLY DISPLAYING THE INFORMATION

(75) Inventors: Stuart Kent Card, Los Altos Hills, CA (US); Tobias Hans Höllerer, New York, NY (US); James Edward Pitkow, Palo Alto, CA (US); Richard Carl Gossweiler, III, Sunnyvale, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/488,563

(22) Filed: Jan. 21, 2000

(51) Int. Cl.[7] .............................................. G06F 17/30
(52) U.S. Cl. ....................... 715/802; 715/741; 707/102
(58) Field of Search ............................ 715/501.1, 526, 715/802, 7 H; 707/2, 3, 5, 7, 101, 102

(56) References Cited

U.S. PATENT DOCUMENTS

| | | | | |
|---|---|---|---|---|
| 5,594,897 | A * | 1/1997 | Goffman | 707/102 |
| 5,761,497 | A * | 6/1998 | Holt et al. | 707/5 |
| 5,832,476 | A * | 11/1998 | Tada et al. | 707/2 |
| 5,835,905 | A * | 11/1998 | Pirolli et al. | 707/3 |
| 6,078,924 | A * | 6/2000 | Ainsbury et al. | 707/101 |
| 6,256,648 | B1 * | 7/2001 | Hill et al. | 715/501.1 |
| 6,289,342 | B1 * | 9/2001 | Lawrence et al. | 707/7 |
| 6,647,534 | B1 * | 11/2003 | Graham | 715/526 |

OTHER PUBLICATIONS

Peter Pirolli et al., "Information Foraging," Oct. 1999, Psychological Review, vol. 106, No. 4, pp. 643-675.

Daniel M. Russell et al., "The Cost Structure of Sensemaking," Apr. 24-29, 1993, ACM/IFIPS INTERCHI '93 Conference on Human Factors in Software, Amsterdam, pp. 269-276.

D.C. Engelbart, "Augmenting Human Intellect, " Stanford Research Institute, AFOSR-3223, Oct. 1962, pp. 1-133.

Ted Nelson, "Literary Machines," Swarthmore, PA, self-published, 3rd Ed., 1981.

Nicole Yankelovich et al., "Intermedia: The Concept and the Construction of a Seamless Information Environment," IEEE Computer, vol. 21, Jan. 1988, pp. 81-96.

Eugene Garfield, "Citation Indexing: Its Theory and Application in Science, Technology, and Humanities," John Wiley & Sons, 1979.

Jock D. Mackinlay et al., "An Organic User Interface For Searching Citation Links," ACM Conference on Human Factors in Software (CHI '95), 1995, Denver, Colorado, pp. 67-73.

Ed H. Chi et al., "Visualizing the Evolution of Web Ecologies," ACM Conference on Human Factors in Software, 1998, Los Angeles, CA, pp. 400-407.

Chaomei Chen et al., "Traiblazing the Literature of Hypertext: Author Co-Citation Analysis (1989-1998)," Hypertext '99, 1999, Darmstadt, Germany, pp. 51-60.

(Continued)

*Primary Examiner*—Heather R. Herndon
*Assistant Examiner*—Doug Hutton
(74) *Attorney, Agent, or Firm*—Finnegan, Henderson, Farabow, Garrett & Dunner L.L.P.

(57) ABSTRACT

An electronic medium is a new form of publication for a source material, such as a book. The medium includes information about features of the source material and features of secondary information related to the source material. The medium can be used with a visualization system. With the system, a user is provided with tools that respond to the user's needs and requests at a level of the collection, rather than just with a single work.

25 Claims, 18 Drawing Sheets

OTHER PUBLICATIONS

Stuart K. Card et al., "Readings In Information Visualization: Using Vision To Think," 1999, San Francisco, CA: Morgan-Kaufmann.

George G. Robertson et al., "Information Visualization Using 3D Interactive Animation," Communications of the ACM, 1993, vol. 36, pp. 57-71.

Peter Pirolli et al., "Silk from a Sow's Ear: Extracting Usable Structures from the Web," Xerox PARC, pp. 1-13.

Gerald Salton et al., "On the Use of Spreading Activation Methods in Automatic Information Retrieval," SIGIR '88, 1988, Grenoble, France, pp. 147-160.

P. Zunde, "Structural Models of Complex Information Sources," Information Storage and Retrieval, 1971, vol. 7, pp. 1-18.

M.M. Kessler, "Bibliographic Coupling Between Scientific Papers," American Documentation, 1963, vol. 14, pp. 10-25.

Henry Small, "Co-citation in the Scientific Literature: A New Measure of the Relationship Between Two Documents, " Journal of the American Society for Information Science, 1973, vol. 24, pp. 265-269.

John R. Anderson et al., "Spread of Activation," Journal of Experimental Psychology: Learning, Memory, and Cognition, vol. 10, 1984, pp. 791-798.

Bernando A. Huberman et al., "Phase Transitions in Artifical Intelligence Systems," Artifical Intelligence, 1987, vol. 33, pp. 155-171.

"Alice: Rapid Prototyping for Virtual Reality," IEEE Computer Graphics and Applications, May 1995, pp. 8-11.

Stuart K. Card et al., "The Cost-of-Knowledge Characteristic Function: Display Evaluation for Direct-Walk Dynamic Information Visualizations," ACM Conference on Human Factors in Software, 1994, (CHI '94), Boston, MA, abstract.

* cited by examiner

FIG. 1
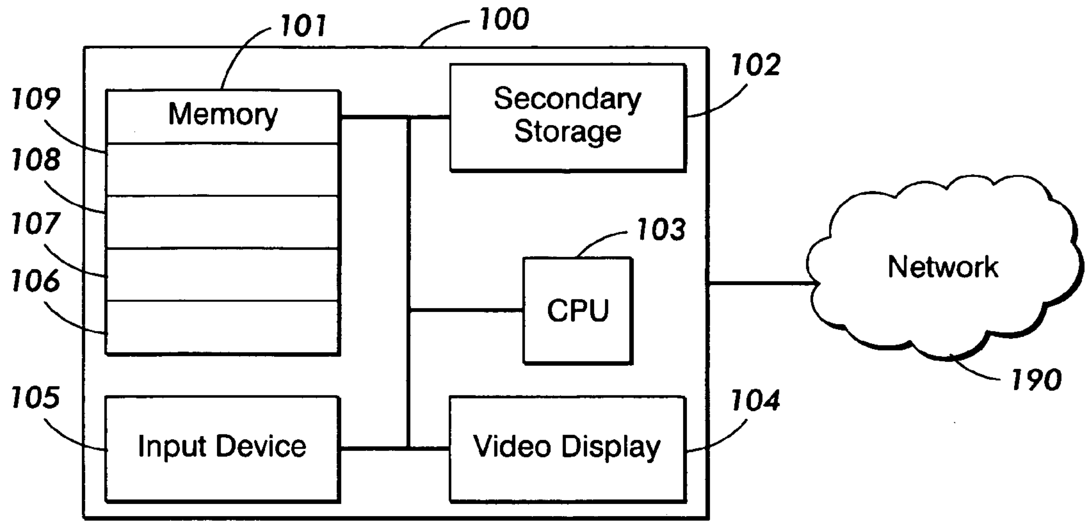
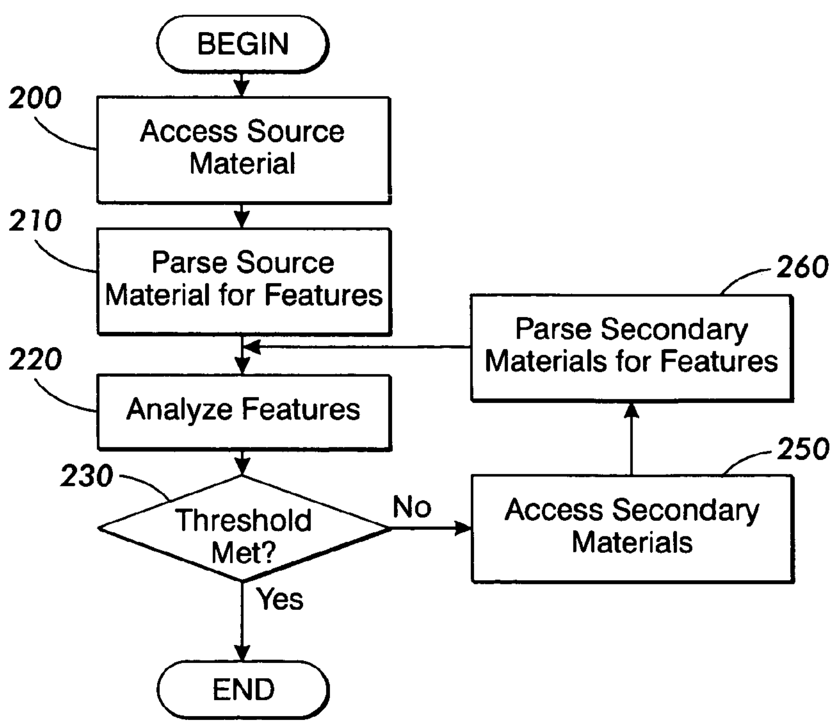
FIG. 2

FIG. 4
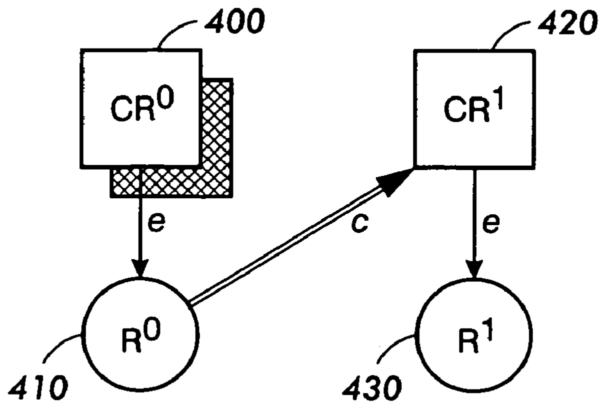
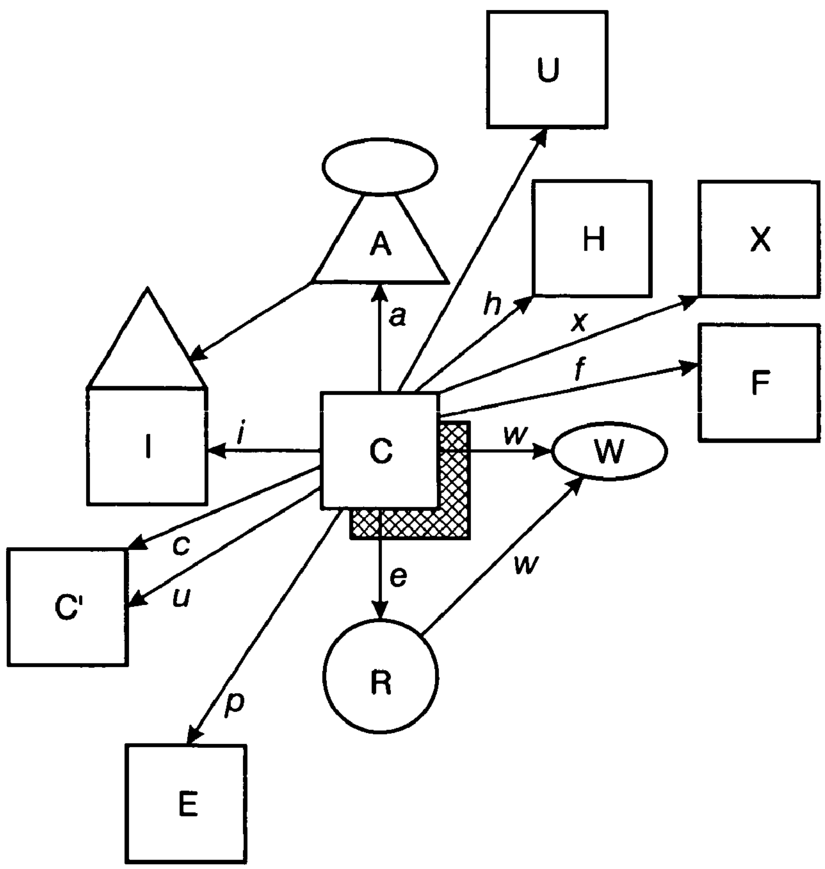
FIG. 5

FIG. 6
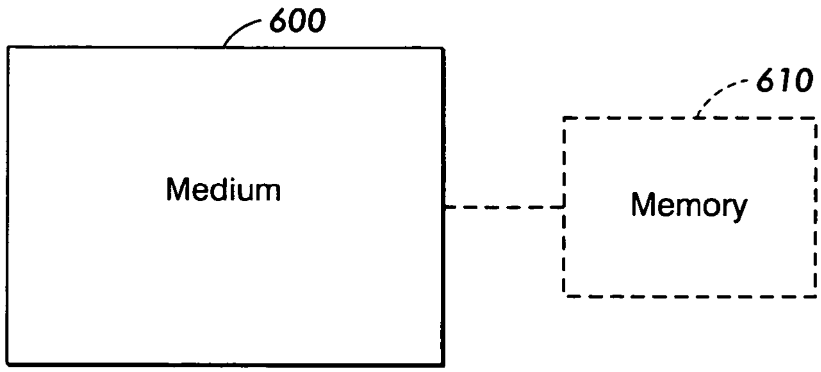
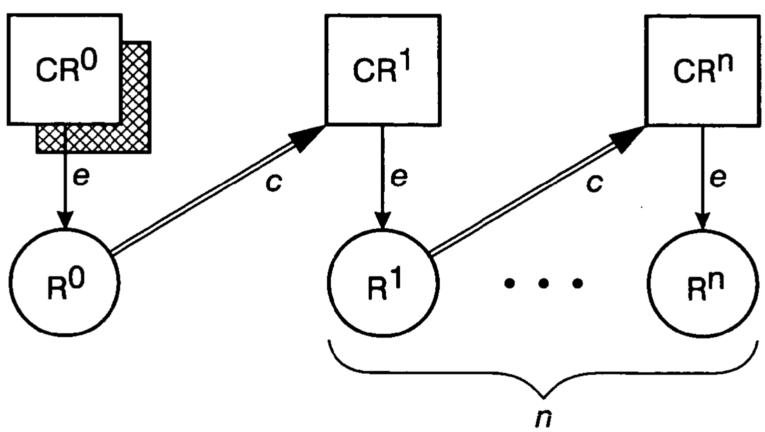
FIG. 7A
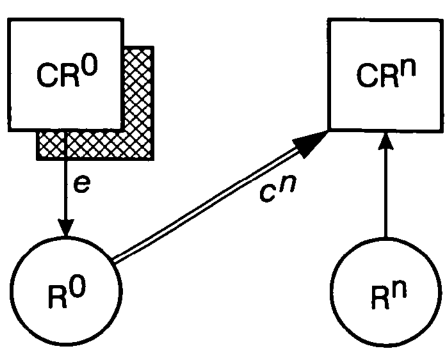
FIG. 7B

FIG. 9
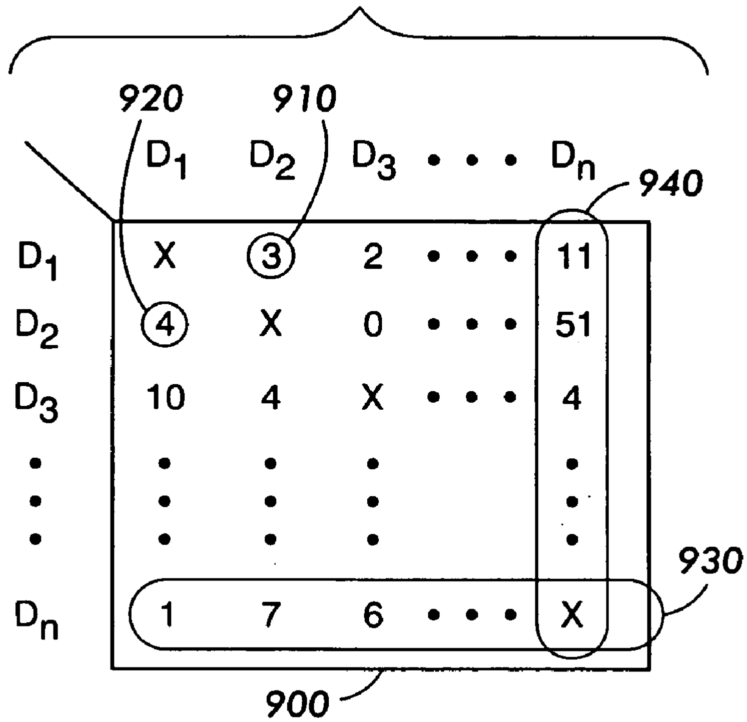
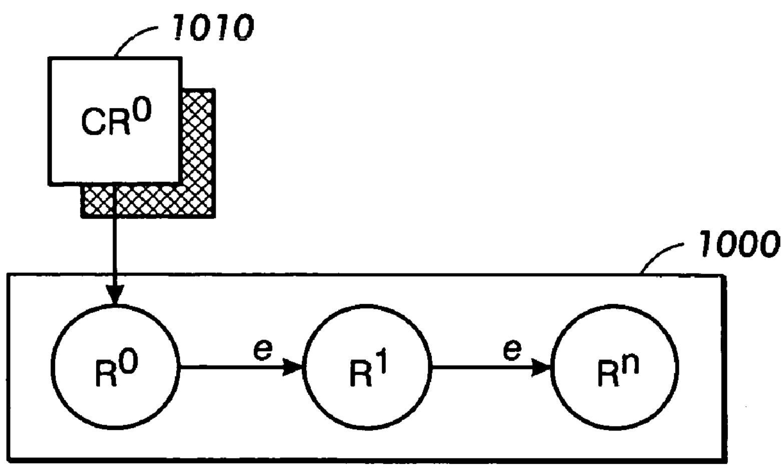
FIG. 10

MEDIUM CONTAINING INFORMATION GATHERED FROM MATERIAL INCLUDING A SOURCE AND INTERFACE FOR GRAPHICALLY DISPLAYING THE INFORMATION

BACKGROUND OF THE INVENTION

A. Field of the Invention

The present invention relates to a medium containing information gathered from material including a source, and a data processing system for generating content for the medium and permitting access to the content.

B. Description of the Related Art

The communication and manipulation of ideas is limited by the forms in which they can be packaged and transported. Books in their modern, codex form are a substantial improvement on earlier forms in the amount of information that can be packaged together, the portability of that information, the speed with which the information can be accessed, and its suitability for commerce. A typical book might consist of 400 pages, contain 160,000 words, and weigh 4 pounds. It is possible to find books larger or smaller than this by perhaps a half-order of magnitude (factor of 3). Beyond this range, larger material tends to be broken into separate book volumes, as in encyclopedias, and smaller material tends to be grouped into book volumes, as in journals of scientific articles or collections of short stories.

Essentially, the size of books in terms of physical form and number of pages is determined first by what a reader finds convenient to carry and second by what the publisher finds economical to publish and distribute. Very large books or very expensive books exist, but tend to have limited markets and distribution. On the other hand, paperback pocket books, the books of truly mass circulation, conform carefully to a portable size and economical cost.

The cost in time of accessing information in a book is much lower than accessing information outside the book, such as the contents of other publications the book references. Access to additional material not previously assembled may mean a trip to the library or ordering from a publisher, processes requiring hours or even weeks. Moreover, even if all the referenced contents have been assembled, they would not share the book's portability, i.e. they could not be readily packed off to the beach or taken home from work.

These limitations on book size mean that it is not practical to publish a book together with the contents of the material it cites. Yet, references are often pursued as a consequence of reading the book. This use of books is part of a larger process called knowledge crystallization.

Knowledge crystallization includes collecting information, making sense of it, and authoring some new work based on the research and insight. An example would be writing a scientific research paper or authoring a business slide presentation.

The idea of electronic, hyperlinked books exists. For example, D. C. Engelbart, "Augmenting Human Intellect: A Conceptual Framework," Stanford Research Institute, Menlo Park, Calif. AFOSR-3223 (October 1962); T. H. Nelson, *Literary Machines*. Swarthmore, Pa.: Self-published (1981); and N. Yankelovich et al., "Intermedia: The Concept and Construction of a Seamless Information Environment," *IEEE Computer*, vol. 21, pp. 81–96, 1988, developed hypertext systems in which documents were related to each other through links. Engelbart and Nelson's systems, however, emphasized merely linking in a new document that references other documents already in the system, and the links in the Engelbart, Nelson, and Van Dam systems must be explicitly authored.

J. R. Remde et al., "Superbook: An Automatic Tool for Information Exploration," (1987) (presented at ACM Hypertext '87 Proceedings) and D. E. Egan, J. R. Remde et al., "Behavioral evaluation and analysis of a hypertext browser," (1989) (presented at ACM CHI '89 Conference on Human Factors in Computer Systems, Austin, Tex.) describe a hyperlinked "Superbook" with integrated fisheye visualization and indexing. Creating an electronic Superbook from an existing paper statistics manual resulted in improved access time for information.

There are currently many electronic, hyperlinked books on the market. Typical of the genre are THAMES & HUDSON, ART 20: THE THAMES AND HUDSON MULTIMEDIA DICTIONARY OF MODERN ART (CD-ROM Ed. 1999) and HOPKINS TECHNOLOGY, COMPLETE ACUPUNCTURE (CD-ROM ed. 1997). These examples contain such features as searchable text, bookmarking, annotations, and writable notebooks.

E. GARFIELD, CITATION INDEXING—ITS THEORY AND APPLICATION IN SCIENCE, TECHNOLOGY, AND HUMANITIES (1979) discusses the use of citation indexing and cocitation analysis for analyzing the structure of document collections and the Science Citation Index. J. Mackinlay et al., "An Organic User Interface for Searching Citation Links," (1995) (presented at ACM CHI '95 Conference on Human Factors in Software, Denver, Colo.) used online access to the Science Citation Index to create virtual visual collections for searching. E. H. Chi et al. "Visualizing the Evolution of Web Ecologies," (1998) (presented at ACM CHI '97 Conference on Human Factors in Software) used bibliometric techniques, such as cocitation analysis, to visualize Websites. C. Chen and L. Carr, "Trailblazing the Literature of Hypertext: Author Co-citation Analysis (1989–1998)," (1999) (presented at Hypertext '99, Darmstadt, Germany) used cocitation analysis to visualize the literature of the Hypertext conference proceedings.

The prior systems, however, fail to adequately provide a user quick access to information related to a source material. Further, the prior systems fail to provide a visualization of source material and information related to a source material that can maximize the user's understanding of the material.

SUMMARY OF THE INVENTION

Systems and methods consistent with the present invention significantly effect a reader's ability to understand information provided in a source material and related secondary material. For example, systems and methods consistent with the present invention provide a medium including information regarding features of a source material and features of secondary materials related to the source material. Collecting the information on a medium permits quick access to the information.

In addition, information regarding features of a source material and features of secondary materials related to the source material can be graphically displayed in color and arranged to form patterns at a large scale, thereby aiding in the exploration of information contained in the medium. Unlike a physical book, the information can be manipulated and analyzed not just by the reader, but also by statistical processes. Thus, systems and methods consistent with the present invention can make specific recommendations for reading based on the user's indication of items of interest in the medium.

In accordance with methods consistent with the present invention, a method is provided for producing a storage medium that provides information regarding a source material. The method comprises the steps of gathering features of the source material, accessing secondary materials related to the features, gathering features of the secondary materials, determining attributes of the gathered materials, analyzing the attributes based on a predetermined characteristic, and recording information regarding the source material and the secondary materials based on the analysis.

In accordance with another method consistent with the present invention, a method is provided for providing a user interface for graphically displaying information. The method comprises the steps of displaying information regarding a source material and secondary materials, determining a selection of information based on a user input, analyzing the source material, the secondary materials, and the selection of information, and updating the display of information regarding the source material and secondary materials based on the analysis.

In accordance with an apparatus consistent with the present invention, an apparatus is provided for producing a storage medium that provides information regarding a source material. The apparatus comprises a memory including a program, a processor for executing the program, and a storage medium, wherein the program includes instructions to gathers features of the source material, access secondary materials related to the features, gather features of the secondary materials, determine attributes of the gathered materials, analyze the attributes based on a predetermined characteristic, and record on the storage medium information regarding the source material and the secondary materials based on the analysis.

In accordance with a user interface consistent with the present invention, an interface is provided for graphically displaying information. The interface comprises a display that displays information regarding a source material and secondary materials, a user interface that determines a selection of information based on a user input and performs an analysis based on the source material, the secondary materials, and the selection of information, and a controller that instructs the display of information regarding the source material and secondary materials to be updated based on the analysis.

A medium produced using principles consistent with the present invention has a format for interacting with an automated information accessing device, the format including information for use in assisting a user to understand a source material, wherein the format includes information produced by a method, the method comprising gathering features of the source material, accessing secondary materials related to the features, gathering features of the secondary materials, determining attributes of the gathered materials, analyzing the attributes based on a predetermined characteristic, and recording, based on the format, information regarding the source material and the secondary materials based on the analysis.

A computer-readable medium produced consistent with the present invention contains instructions for controlling a computer to perform a method for producing a storage medium that provides information regarding a source material, including gathering features of a source material, accessing secondary materials related to the features, gathering features of the secondary materials, determining attributes of the gathered materials, analyzing the attributes based on a predetermined characteristic, and recording information regarding the source material and the secondary materials based on the analysis.

Another computer-readable medium produced consistent with the present invention contains instructions for controlling a computer to perform a method for providing an interface for graphically displaying information, including displaying information regarding a source material and secondary materials, determining a selection of information based on a user input, analyzing the source material, the secondary materials, and the selection of information, and updating the display of information regarding the source material and secondary materials based on the analysis.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the implementations of the invention and together with the description, serve to explain the principles of the invention.

FIG. 1 illustrates an example of a computer system consistent with the present invention;

FIG. 2 is a flow chart of steps of the process for producing a medium consistent with the present invention;

FIG. 4 is a schematic diagram of the information in FIG. 3.

FIG. 5 illustrates features in a source material;

FIG. 6 illustrates a medium consistent with the present invention;

FIGS. 7A, 7B, and 8 illustrate mediums consistent with the present invention;

FIG. 9 illustrates a matrix consistent with the present invention;

FIG. 10 illustrates another medium consistent with the present invention;

DETAILED DESCRIPTION

Figure 3:
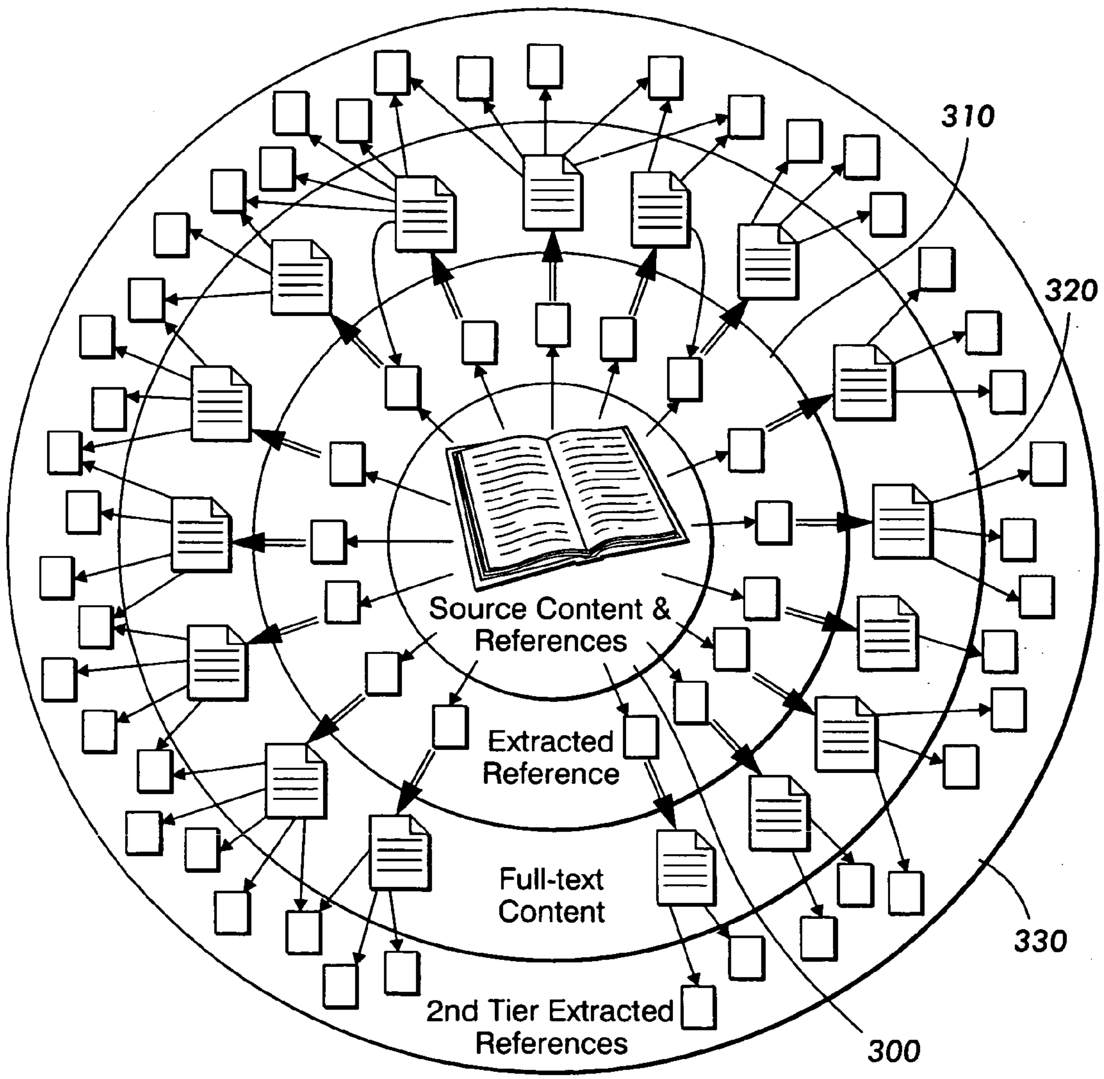
FIG. 3 illustrates the information provided in a basic medium consistent with the present invention.

Reference will now be made in detail to the construction and operation of an implementation of the present invention which is illustrated in the accompanying drawings. The present invention is not limited to this implementation but it may be realized by other implementations.

A. Overview

Systems and methods consistent with the present invention create a medium containing information related to material including a source and provide an interface to graphically display this information.

Unlike previous mediums linking information related to a source material, an automated process creates a medium consistent with the present invention. The process includes a gathering routine that accesses material, gathers features of the material, and indexes the features as objects. An analysis routine of the process then determines attributes of the objects. A stop routine of the process checks the attributes based on a predetermined characteristic. If the characteristic is found, the objects are provided on the medium. If the characteristic is not found, the stop routine recalls the gathering routine to iteratively seek additional material and features. Because of the automated process, the medium content does not have to be specifically authored. Also, in some cases, all of the features related to a source material could be provided on a medium. In other cases, the analysis routine could involve a statistical process, used to limit the number of objects provided on the medium.

The interface simultaneously displays representations of all of the objects provided on the medium to allow a user to see the materials on a large scale. The display includes a representation of objects of the source material in a first area and objects of the secondary materials in a second area. Interaction with the objects permits the objects to be rearranged based on user interest. The display areas are linked so that manipulation of an object in one area will effect a view of the same object in another area, for example. Using the interface, a user can rapidly gain greater understanding of the material.

B. Architecture

A computer system used to create a medium or a data processing system using a medium could be number of machines, a separate machine, or a portion of a machine. An exemplary computer system is illustrated in FIG. 1. A computer 100 communicates via a network 190, such as the Internet or an Intranet, with other devices, such as computers. Computer 100 includes a memory 101, secondary storage 102, a central processing unit (CPU) 103, a video display 104, and an input device 105. One skilled in the art will appreciate that computer 100 may contain additional or different components. Memory 101 includes an operating system 106, a TCP/IP protocol stack 107, a program to create a medium 108, and a visualization program 109. When multiple computer systems are used, programs 108 and 109 could reside on different systems.

The program to create a medium 108 includes a gathering routine, an analysis routine, and a stop rule routine. Visualization program 109 includes a graphics engine, a user interface that monitors user action and dynamically predicts user interest, a control routine for the visualization, a document database, and a browser routine.

B. Architectural Operation

1. Creating the Medium

FIG. 2 illustrates a flow chart of the steps of the program to create a medium designed in accordance with principles of the present invention. For explanatory purposes, FIG. 3 illustrates a basic implementation of the information provided in such a medium. The medium of FIG. 3 includes the contents of a book together with the contents of all the references in the book plus all the references of those references. FIG. 4 illustrates a schematic diagram of the information provided in FIG. 3.

Initially, the gathering routine accesses a source material 300 (step 200). Then, the gathering routine parses the content of the source material 300 to find features related to the source material that may be of interest to a user (step 210). As illustrated in FIG. 5, various features are present in documents and can be used to create the medium, including names of authors of the source (A), institutions where the work was created or the authors are from (I), references (R), topic words in the content or references (W), history of use (H), context (X), era or period the work was created (E), and usage (U) based, e.g., the number of times the work was accessed (F) (for example at a public library or number of "hits" on a Web site). Features could also include relationships between features of the source material and secondary materials (C'), such as a similarity between documents (c) using a document vector model of the contents of the documents or relative usage (u) based on, e.g., the number of times or speed that the secondary material was accessed after accessing the source material.

To parse the features, the gathering routine could search the text of the source material or access a previously-extracted feature list. The gathering routine then designates the features as objects. Alternatively, the gathering routine could permit a publisher or an author to intelligently review the gathered information and define the objects using professional judgement, thereby providing or removing materials.

In the example of FIGS. 3 and 4, the features of the source material are the references (R) to other materials in the source material as shown by the rectangles in the first ring 310. In FIG. 4, a box 400, notated $CR^0$, represents the content (and embedded references) of the source material. Box 400 is shown in shadow because it is the seed from which the other information is derived. A circle 410, denoted $R^0$, represents the set references extracted as objects. The operator e, in this case, represents an operation "references," and this portion of FIG. 4 means that "$CR^0$ references $R^0$."

Once the features of the source material are extracted as objects, the analysis routine determines attributes of the features (step 220). For example, the medium in FIG. 3 provides the references, the content of references, and the references of the references. Therefore, in step 220 for the medium in FIG. 3, the generational level of references is determined, for example an iteration number could be incremented. Other attributes could include the amount of information gathered, the earliest publication date of the gathered information, or a statistical attribute (which will be discussed in detail below).

Based on the determined attributes, a stop routine analyzes the attributes to see if an attribute has a predetermined characteristic (step 230). This analysis could ensure that the total amount of information is within a preset limit, such as the capacity of a physical storage medium. Also, the analysis could look for the presence or absence of certain attributes of the source material and secondary materials, such as the presence of selected key words. The stop routine could analyze a plurality of attributes, each associated with different characteristics, and provide a single result through processing.

If the stop routine detects the presence of the predetermined characteristic, the stop routine inhibits gathering information for the medium (step 240). Otherwise, the stop routine calls the gathering routine to iteratively access and parse secondary material, thereby locating and processing more information (steps 250 and 260).

In the example of FIGS. 3 and 4, the analysis routine determines that merely the source material is present. Because the stop routine is checking for gathered references of the references, the stop routine thus calls the gathering routine to complete the medium of FIG. 3.

The gathering routine accesses the content of the references and sets them as objects (step 250). In FIG. 3, the contents of the publications referred to in the first ring 310 are shown in the second ring 320 as page icons. In FIG. 4, a box 420, denoted $CR^1$, is the set of the contents of all the documents referred to in $R^0$. The operator c, in this case, represents an operation "citation," and this portion of FIG. 4 means that "$R^0$ is a citation for $CR^1$." The gathering routine then parses the contents of the references to determine a second set of references cited by the first set of references. Each reference in the second set is also set as an object (step 260). In FIG. 3, the references to the references are shown by the rectangles in the third ring 330. Although not illustrated, some references could be to works in the first ring 310 and other works in the second ring 320. In FIG. 4, a circle 430, denoted $R^1$, is the set of references extracted from $CR^1$. Once again, the analysis routine determines attributes (step 220) and the stop routine checks for the predetermined characteristic (step 230). This time, the stop routine finds the characteristic in the attributes and stops the gathering of information (step 240).

Based on the objects gathered in the gathering routine, as shown in FIG. 6, a medium 600 is electronically published on portable storage medium, such as a digital video disk (DVD), compact disk read only memory (CD-ROM), tape, or non-volatile random access memory (NVRAM), or the World Wide Web, or a format for a personal device, such as a personal digital assistant (PDA). Also, when medium 600 is provided on an alterable storage medium, medium 600 could be updated. Alternatively, when medium 600 is not alterable, an alterable memory 610 could be provided in conjunction with medium 600 to update the medium.

Regardless of how medium 600 is published, it includes an index pointing to where objects contained in the medium are located for quick access to information in the objects. In the case of FIGS. 3 and 4, the index would point to where the content of the source material is located, where the contents of all the references are located, and where a list of all the references of those references is located. In some cases, such as Web publishing, the index may be the eminent thing published.

Other mediums could also be provided. For example, as shown notationally in FIG. 7A and equivalently in FIG. 7B, medium 600 could also include the contents of the references of references and so on for n generations of secondary materials. In the case of FIGS. 7A and 7B, the stop routine would look for the characteristic of n generations of references. Also, instead of being backward looking, the gathering routine could access and parse the features of an existing work. For example, a forward-looking medium could include materials that cite the existing work (look forward to materials influenced by the existing work). This type of medium would be helpful to analyze the effect an existing work had on a particular field. In addition, to determine how important a work is, a medium could look both forward and backward. This type of analysis is particularly useful for festschrift, which is a collection of essays or other writings contributed by students, teachers, colleagues, and admirers to honor a scholar, physician, or other scientist on a special occasion noting an event of importance in his or her life, or works that are regarded as revolutionary, such as Einstein's photo-electric effect paper.

Figure 8:
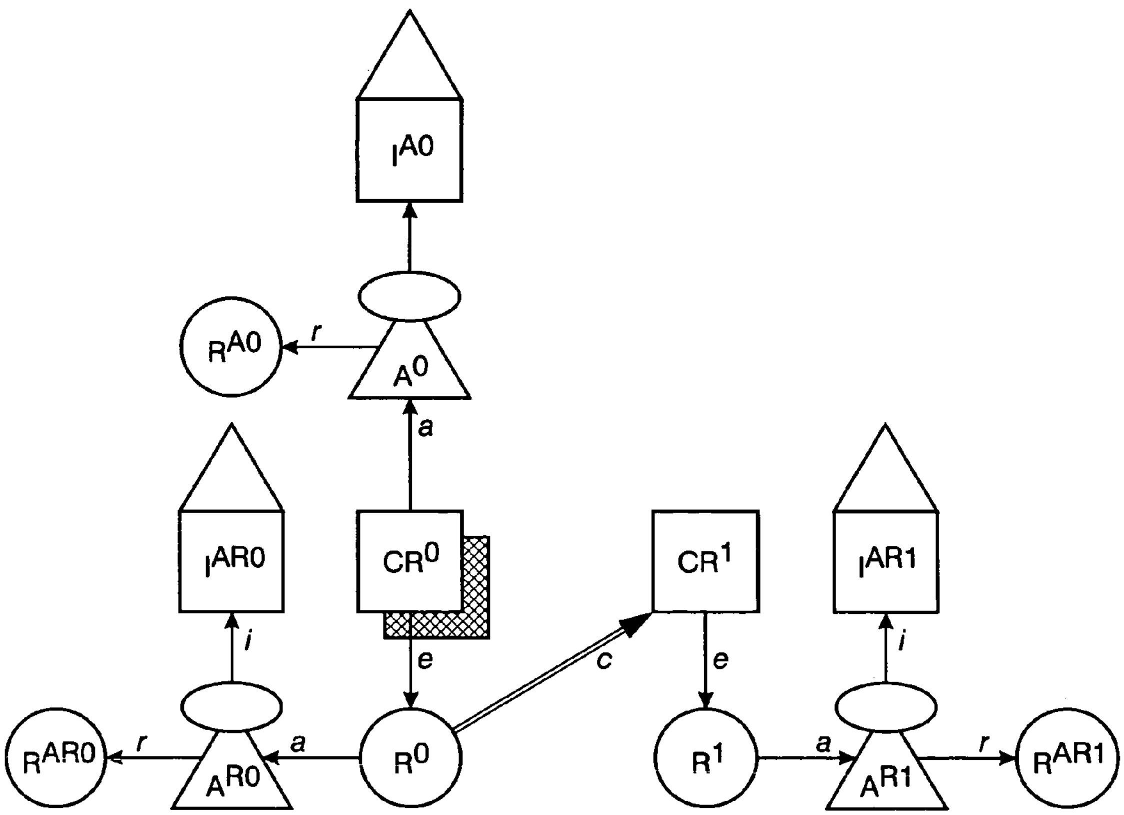

FIG. 8 shows an example of a more complex medium including information regarding authors and institutions related to the source material. Extracted from source material $CR^0$ are a set of references $R^0$ and a set of authors $A^0$ and institutions where the authors were associated $I^{A0}$. Other articles that one or more of the authors in set $A^0$ wrote are listed in reference set $R^{A0}$. From reference set $R^0$, a set of authors $A^{R0}$ who wrote the references is determined. Then, the set of institutions $I^{AR0}$ where the authors were associated is determined. Other articles that one or more of the authors in set $A^{R0}$ wrote are listed in reference set $R^{AR0}$. The content $CR^1$ of references $R^0$ is provided in the medium, and similarly to $CR^0$, sets of references $R^1$, authorship $A^{R1}$, institutions $I^{AR1}$, and author's references $R^{AR1}$ are provided in the medium.

For some source materials, medium 600 would ideally contain every conceivable secondary material. Nevertheless, the volume of such secondary material may exceed the maximum amount of information that can be stored on a storage medium, such as a CD-ROM or DVD, or contain such a large amount of useless information to be meaningless. Using manual pruning or statistical analysis to identify attributes of the source and secondary materials, in step 220 medium 600 can include only the most important and relevant secondary materials. In one aspect of the invention, the statistical analysis is always performed. In another aspect of the invention, the statistical analysis is performed when the gathered information exceeds a predetermined amount, i.e. the stop rule checks the attribute of total size of data collected, triggers the statistical analysis when the total size exceeds a predetermined amount, and calls the analysis routine.

a. Statistical Analysis

The analysis routine can use various statistical analyses to determine the attributes of gathered features. Examples of techniques to determine attributes can be found in C. Chen and L. Carr, supra; S. K. CARD, J. D. MACKINLAY, AND B. SHNEIDERMAN, INFORMATION VISUALIZATION: USING VISION TO THINK (1999), G. G. Robertson et al. "Information visualization using 3D interactive animation," 36 *Communications of the ACM* 57–71, 1993; P. Pirolli et al., "Silk from a Sow's Ear: Extracting Usable Structures from the Web," (1996) (presented at Conference on Human Factors in Computing Systems, CHI '96, Vancouver, Canada); G. Slaton and C. Buckley, "On the Use of Spreading Activation Methods in Automatic Information Retrieval," (1988) (presented at SIGIR '88, Grenoble, France); P. Zunde, "Structural Models of Complex Information Sources," 7 *Information Storage and Retrieval* 1–18 (1971); M. M. Kessler, "Bibliographic Coupling Between Scientific Papers," 14 *American Documentation* 10–25 (1963); I. V. Marshakova, "System of Document Connectionism Based on References," Series 2 *Nauchno-Teknicheskaya Informatsiya* 2–6, (1973); H. Small, "Co-citation in the Scientific Literature: a New Measure of the Relationship Between Two Documents," *Journal of the American Society for Information Science*, vol. 24, pp. 265–269 (1973); J. R. Anderson and P. L. Pirolli, "Spread of Activation," 10 *Journal of Experimental Psychology: Learning, Memory, and Cognition* 791–798 (1984); and B. A. Huberman and T. Hogg, "Phase Transitions in Artificial Intelligence Systems," 33 *Artificial Intelligence* 155–171 (1987), all of which are incorporated by reference herein.

The analysis routine may use attributes of a cocitation statistical analysis. The cocitation statistical analysis uses a citation index, created by populating an incidence matrix (or citation matrix, an example 900 of which is shown in FIG. 9) based on relationships between materials shown in a directed graph (citation graph or citation network, which is similar to the graphs of, e.g., FIGS. 4 and 5). The incidence matrix is a square matrix with each material being a respective row and column.

For example, a cocitation statistical analysis using the features of references would include a directed graph edge between node $D_i$ and node $D_j$ indicating that $D_i$ references $D_j$ and that $D_j$ contains a citation from $D_i$. The value of the cell for row $D_i$ and column $D_j$ denotes the number of times document $D_i$ refers to document $D_j$, which is called the citation frequency. In this manner, a citation matrix C illustrates the "reference" relationships and the transpose of the citation matrix $C^T$ illustrates the "is-referenced-by" relationships. As can be seen in FIG. 9, cell 910 indicates that document $D_1$ references document $D_2$ three times, and cell 920 shows document $D_2$ references document $D_1$ once.

With m features that contain references to n other features in a citation matrix $C=(c_{ij})$, then the number of references of document $D_i$ is the sum of the row vector for $D_i$ or $(CC^T)_{ii}$, and the number of citations received by document $D_i$ is the sum of the column vector for $D_i$ or $(C^TC)_{jj}$. In FIG. 9, oval 930 indicates that document $D_n$ references at least 1+7+6 or 14 documents, and oval 940 indicates that document $D_n$ is referenced by at least 11+51+4 or 66 other documents.

A bibliographic coupling strength, which indicates the number of references that documents $D_i$ and $D_j$ share in common, can also be computed as an attribute. The bibliographic coupling strength is given by the equation:

$$\sum_{k=1}^{n} C_{ik} C_{jk} = (CC^T)_{ij}$$

Once written, the references a document $D_i$ makes to other materials are fixed, yet additional papers can be written that reference $D_i$ as well as cite the references in $D_i$. At any given point in time, one can inspect the bibliographic coupling strengths for a set of documents to gain insight into what awareness authors had of each others work or used to retrieve the set of documents most bibliographically coupled to a document. In other words, the medium could include only the documents having a bibliographic coupling strength larger than a predetermined amount.

As time progresses, this set of bibliographically coupled items can increase as others cite similar papers and a medium that updates the collection of information could also updated bibliographic coupling strengths.

Cocitation strength, which is the number of citations which documents $D_i$ and $D_j$ share in common, can also be used as an attribute. Cocitation strength is given by the equation:

$$\sum_{k=1}^{m} C_{ki} C_{kj} = (C^T C)_{ij}$$

Cocitation identifies pairs of documents that are references together. Frequently citing documents together implies the shared semantic judgement of others that each of the documents $D_i$ and $D_j$ in the pair $D_iD_j$ is related to the other. This is an important insight because the two documents may not contain a reference to one another. Like bibliographic coupling strengths, cocitation strengths vary over time and can provide a glimpse into the papers that influence a particular field at any given time.

Typical cocitation analysis creates a correlation matrix from the cocitation strengths and applies multidimensional scaling on the results. Visually, related documents cluster together indicating sub-fields within the main field and the medium can include these most relevant materials.

The analysis routine can also use spreading activation to determine attributes. Spreading activation is a class of algorithms that propagate numerical values among a set of connected items. For any features of a source material, activation can be spread though the network of associations. The resulting activation vector can be sorted with the highest values representing items most closely associated with the features of the source material. Since multiple features can be used as sources of activation, the interest function is computed relative to several features at the same time.

For example, the spreading activation analysis can use a leaky capacitor model. An activation network can be represented as a square matrix R, where each element $R_{i,j}$ contains the strength of association between nodes i and j, and the diagonal contains zeros. The amount of activation that flows between nodes is determined by the activation strengths, which for our purposes correspond to bibliographic coupling and cocitation strengths. In some implementations, both bibliographic coupling strengths and cocitation strengths can be used simultaneously. For example, after performing spreading activation on each of bibliographic coupling and cocitation strengths, the results can be added or "fused." Alternatively, matrices respectively representing bibliographic coupling strengths and cocitation strengths can be normalized and summed, with the spreading activation analysis being performed on the result.

Source activation is represented by a vector C, where $C_i$ represents the activation pumped in by node i. The dynamics of activation can be modeled over discrete steps t=1, 2, . . . . N, with activation at step t represented by a vector A(t), with element A(t,i) representing the activation at node i at step t. The evolution of the flow of activation is determined by:

$$A(t)=C+MA(t-1)$$

$$M=(1-\gamma)I+\alpha R$$

where M is a matrix that determines the flow and decay of activation among nodes, with $\gamma$ determining the relaxation of node activation back to zero when it receives no additional activation input, and $\alpha$ denoting the amount of activation spread from a node to its neighbors. I is the identity matrix.

The parameters of M could be fixed for each generation or could vary. Step 230 stops the spreading after a predetermined plies of activation are computed or stops when the activation for all of the features of a generation of the secondary material being analyzed falls below a predetermined threshold. Then, secondary materials having an activation above a predetermined activation are included in medium 600.

Also, the contents of any referenced material does not have to be Included in medium 600. As shown in FIG. 10, a n-th order bibliographic medium 1000 could include n generations of references to a source material 1010.

2. Data Processing System Operation

After the medium is created, a user can manipulate, automatically or manually, the objects contained in the medium to reveal insights about the collection of ideas.

This way of working with the medium is interesting for several reasons. The author of the source material has used her knowledge to choose, e.g., the reference documents as being highly related to the source material. Processing the objects in the medium can be expected to include other works that are evidence for the current work, contrasting views, development of related ideas, descriptions of methodology, etc. In other words, the information of the objects can expand the knowledge provided by the source material in a manner that is unexpected even to the author or publisher of the source material.

A data processing system consistent with the present invention uses the medium to give readers a broad view of how the source material was organized and the reason for that organization, to help the reader determine which articles are the most influential in the field discussed in the source material, and how influence flows in the source material from other information, such as the references, to suggest which materials to read next, and to allow the reader to quickly access the material of interest.

a. Viewing the Scene

The control routine of visualization program 109 is a supervisor for the interface. The control routine controls access to a document database, including for example a medium containing information gathered from material including a source, and commands information therein to be rendered as placards, or icons, using one of a variety of layout algorithms. For example, at start-up, the control routine commands transferring of information contained in a medium into memory, starting a browser routine, and rendering the graphics scene. The control routine can use a basic event-driven model, with timer-events to update animations.

The graphics engine of visualization program 109 composes and maintains an internal scene graph of graphics objects. The graphics engine includes a graphics object database, a rendering engine, and a set of visual operations. The graphics object database stores a number of objects that are to be displayed. The rendering engine uses the graphics database to set up a global state of a scene and uses transform matrices of the objects to render the scene. i.e., the actual rendering is performed by the object itself.

A portion of the scene could include information from the browser routine of visualization program 109. The browser routine calls or includes a program, such as Microsoft's Internet Explorer component, that can present the hypertext markup language (HTML) associated in a visual form.

b. User Interface

The user interface provides the user with commands to display material in the medium, query the information in the medium by keywords in fields such as the contents, references, authorship, or institution, extract portions of the medium, and author new content based on the medium, and responds to the commands. For example, when the user selects placards representing several articles and asks for a recommendation about what to read next, the user interface can use the selections to derive an ordered result-set. The graphics engine would then graphically display the result-set.

The user interface uses similar statistical analysis as that used in creating the medium, placing the reader in control of selecting materials of interest, which is difficult to predict when the document is shipped.

c. Operation of the Visualization Program

Figure 11:
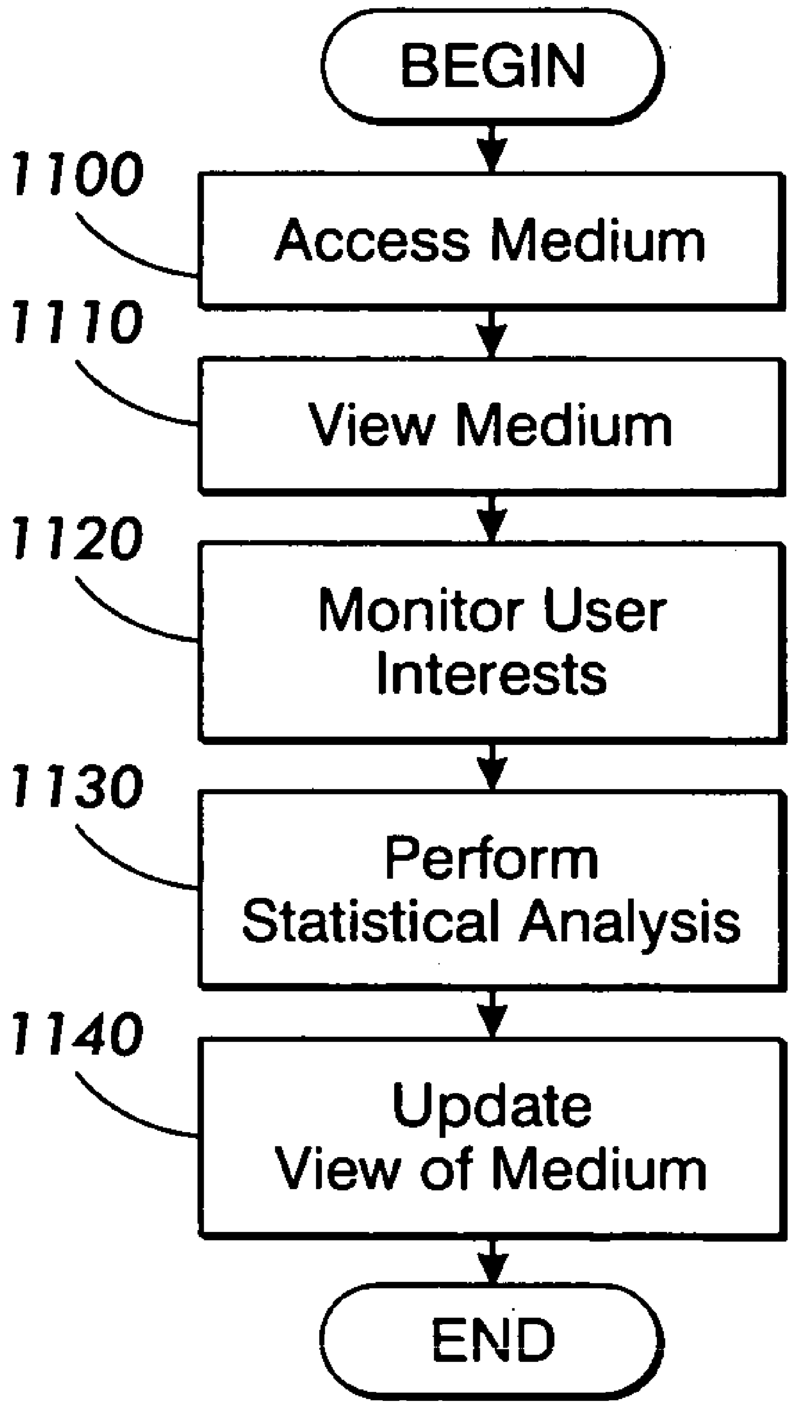
FIG. 11 is a flow chart of steps of the program for visualizing information contained in a medium consistent with the present invention.

The data processing system uses visualization program 109 to provide the graphic display. As illustrated in FIG. 11, the visualization program begins when the user interface detects a user instruction for access to a medium and informs the control routine. The control routine instructs access to the objects in the medium (step 1100) and commands the graphics engine to render and display the objects contained in the medium (step 1110). Some of the details of this visualization of the objects will be explained below with reference to FIGS. 12A–12K.

The user interface then monitors the user's interaction with the objects in the visualization (step 1120). The monitoring could detect affirmative selections, such as a user command to select an object, or implied selections, with a process watching the history and context of a user's actions and determining a degree of interest.

The user interface predicts the preferences of the users based on, e.g., affirmative selection or a statistical process (step 1120) and provides the preferences to the control routine. The control routine instructs the graphics engine to update the view of the medium, for example, by displaying a selected reading in a browser window or highlighting a set of recommended readings in a previous view (steps 1130 and 1140). The statistical analysis could include a combination of spreading activation and citation analysis similar to the analysis used in creating the medium and can employ cocitation and bibliographic coupling strengths as association matrices in the spreading activation model. When implicit selections are used, the source vector can be seeded based upon a history of user selections weighted by time and frequency of the selections.

While the results of the statistical analysis are displayed on a display in step 1140, the user could also arrange the information in structuring substrates, such as information visualization spreadsheets (for examples of information visualization spreadsheets, please see E. H. Chi et al., "A Spreadsheet Approach to Information Visualization," ACM Symposium on User Interface Software and Technology (UIST '97) 79–80 (1997). 79–80; E. H. Chi, "A Framework for Information Visualization Spreadsheets," Ph.D. thesis, University of Minnesota (1999), all of which are incorporated by reference herein) and perspective walls (for examples of perspective walls, please see J. D. Mackinlay et al., The Perspective Wall: Detail and Context Smoothly Integrated," ACM Conference on Human Factors in Computing Systems (CHI '91) 173–179 (1991); and U.S. Pat. No. 5,689,287 issued to Mackinlay et al. on Nov. 18, 1997, all of which are incorporated by reference herein).

Of course, the user could forego statistical analysis and collect sets of references and/or contents into groups and arrange them in any manner that suits the user.

C. Example

To provide a concrete example of the medium and data processing system consistent with principles at the present invention, S. K. CARD ET AL. READINGS IN INFORMATION VISUALIZATION: USING VISION TO THINK (1999) will be used as a source material. This book is an assemblage of articles written in the field of information visualization, and contains 58 objects (47 articles and 9 chapter introductions). The book totals 682 pages, consisting of about 120 pages of original text, 500 pages of reprints of the articles, and front and back matter. The book's bibliography has about 700 references, which are also objects of the medium. The medium of this book would have around 7000 pages, if printed (for ease of explanation, the example visualization illustrates each of the 700 references in the book as an HTML page just containing authors, year, and title, rather than the entire article).

Statistical processing was used in this visualization. Accordingly, the user interface created a database of linkages from the objects of the medium. These linkages were used to derive citation matrices, cocitation matrices, and bibliographic coupling matrices, which form the basis of the tools with which users interact with the medium.

Figure 12A:
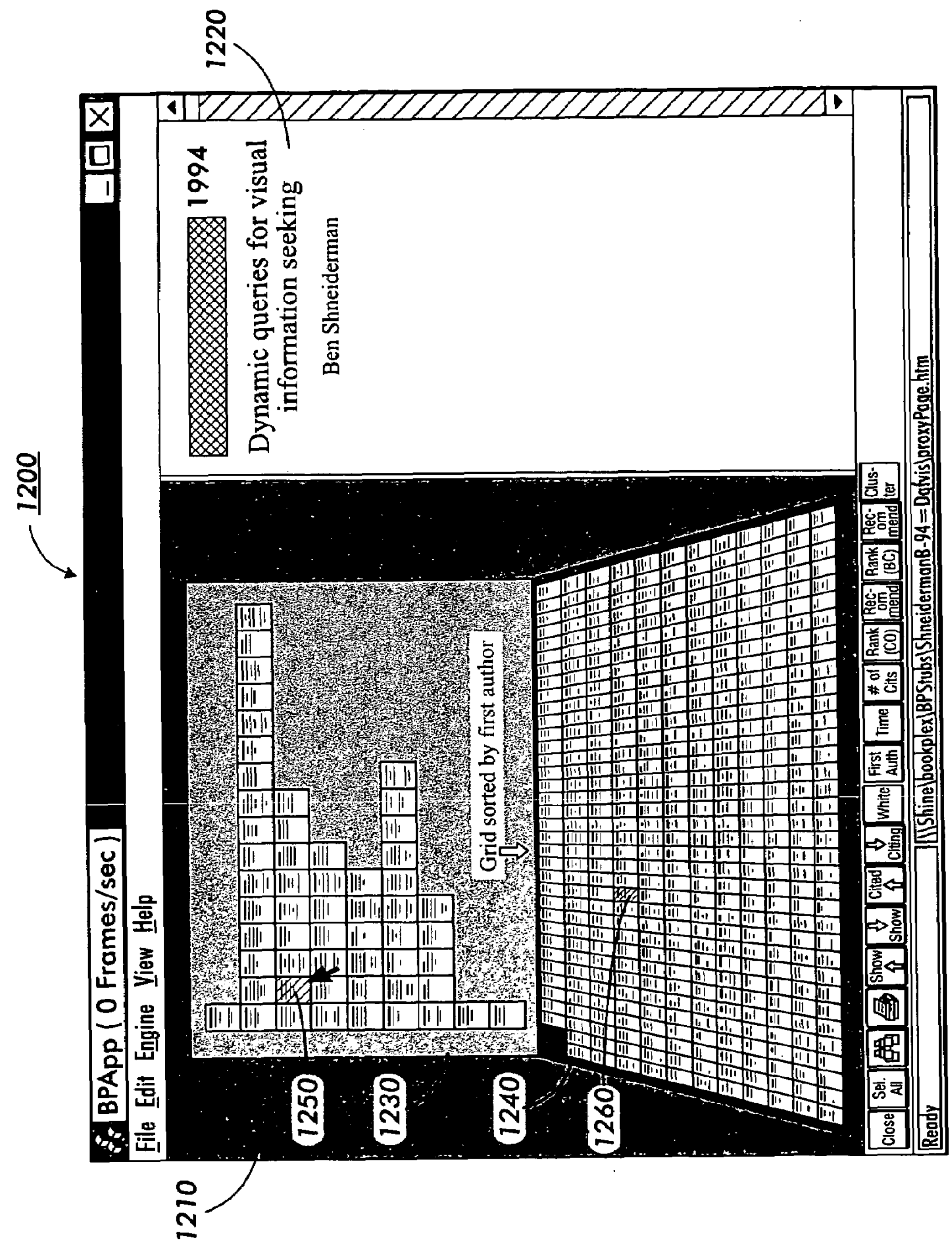
FIGS. 12A–12K are views of graphic displays occurring during an example of the program for visualizing information of FIG. 11.
Figure 12B:
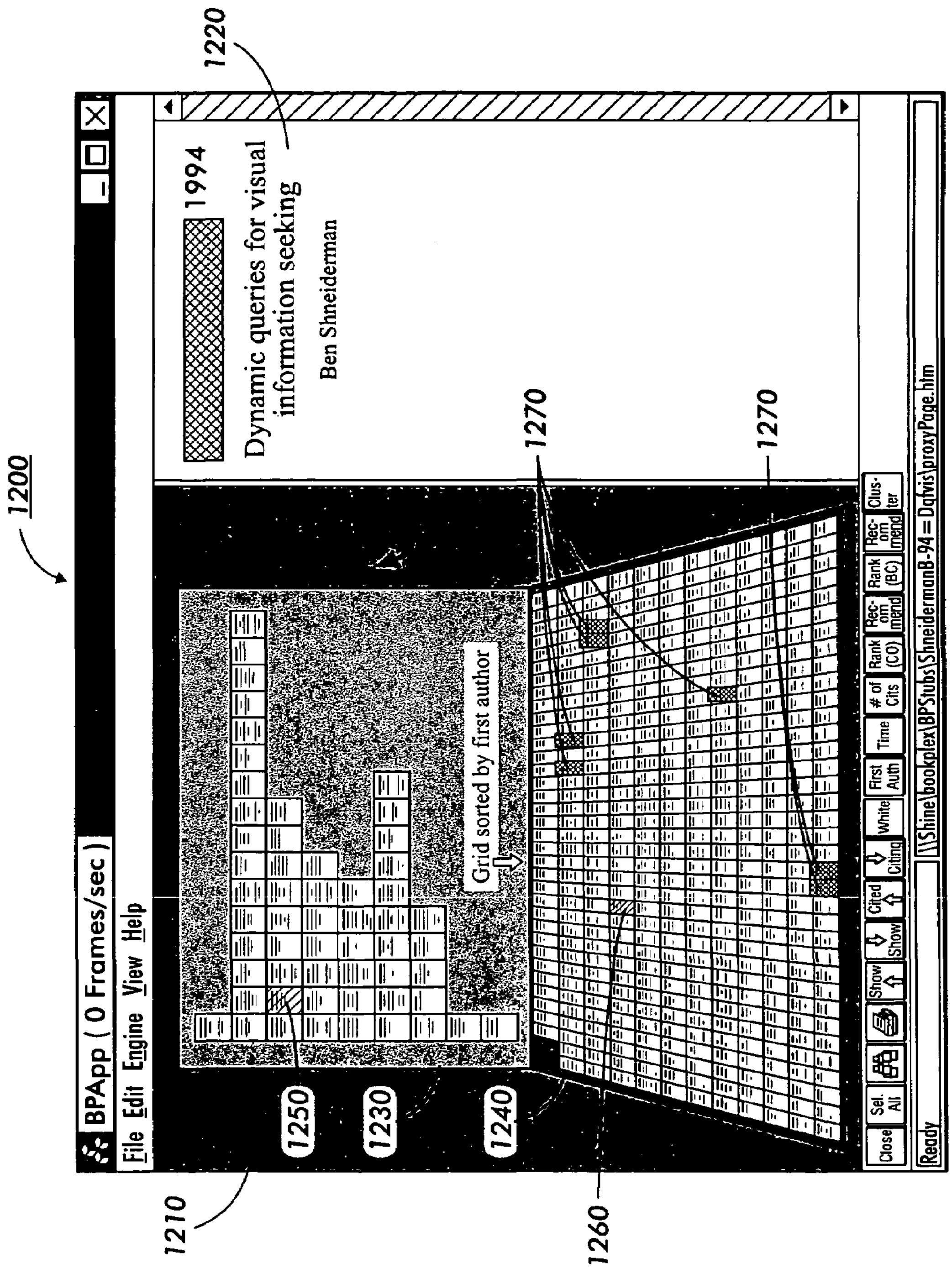
Figure 12C:
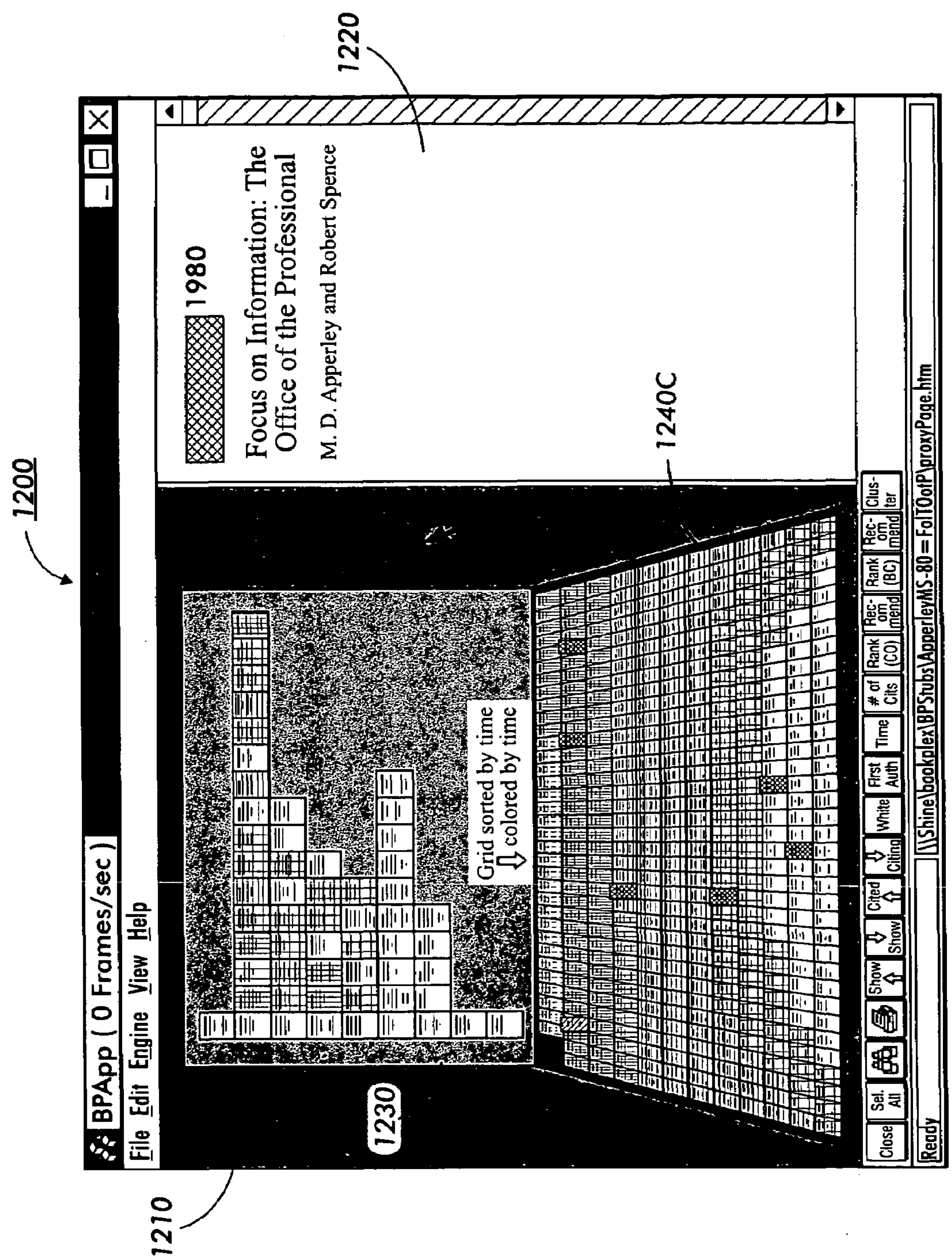

FIG. 12A illustrates an interface for visualization of objects of the medium for READINGS IN FORMATION VISUALIZATION. The interface includes a window 1200 divided into a view of medium contents area 1210 on the left and an HTML browser area 1220 for reading selected materials. The upper part of the medium contents area 1210 is a content board 1230, which visually depicts the set of $CR^0$ in FIG. 4. Content board 1230 includes rows indicating the objects of the source material in a visual format. For example, each row of the content board corresponds to a chapter. Row 3, for example, is the introduction material and 8 articles of Chapter 3. For source material without chapters, the rows of content board 1230 could correspond to a predefined abstraction, such as a predetermined number of pages or paragraphs.

The lower part of contents area 1210 is a citation board 1240 which displays objects of the secondary material (the set $R^0$ of FIG. 4). In FIG. 12A, the set includes 700 references.

Color and display order can be used independently to create visual patterns. A user can select any of the icons representing the materials by, for example, clicking the left button of the mouse. Upon selection, the control routine and graphics engine could change selected material 1250 in form to provide feedback that the desired material was selected (for example, by turning an icon representing the material 1250 green). If an icon of an object in content board 1230 is selected, control routine instructs the graphics engine to change the form of an icon 1260 of the object in citation board 1240. In other words, the content board 1230 and the citation board 1240 are linked. Upon selection, the control routine, graphics engine, and linking program could display selected material in browser area 1220. A different selection could highlight material in a set of interest. For example, selection with the right mouse button will stand up items in the set of interest and turns them blue without displaying the information in the browser area 1220.

Also, the user could search for material by keywords and fields through, for example, a dialog box initiated by an onscreen button. For example, in FIG. 12B, the user has searched for "Spence" in the field "author" and seven of Spence's articles 1270 are highlighted, by illustrating them in a distinctive color and standing them on end.

As a default, the material in the citation board 1240 is sorted alphabetically by the first author's nume. The user can, however, provide different visualization of the medium. For example, in FIG. 12C, citation board 1240C shows the articles from oldest (in the far back left corner) to most recent (in the near right corner) based on a user's interaction with, e.g., an on screen buffer. The user can also ask the knowledge processing system to change the color of the materials every several years to help show boundaries. Of course, the colors will still permit selected documents to be readily visible. Thereby, the user can quickly learn that the article "Focus on Information" is the earliest article in which Spence was an author.

Figure 12D:
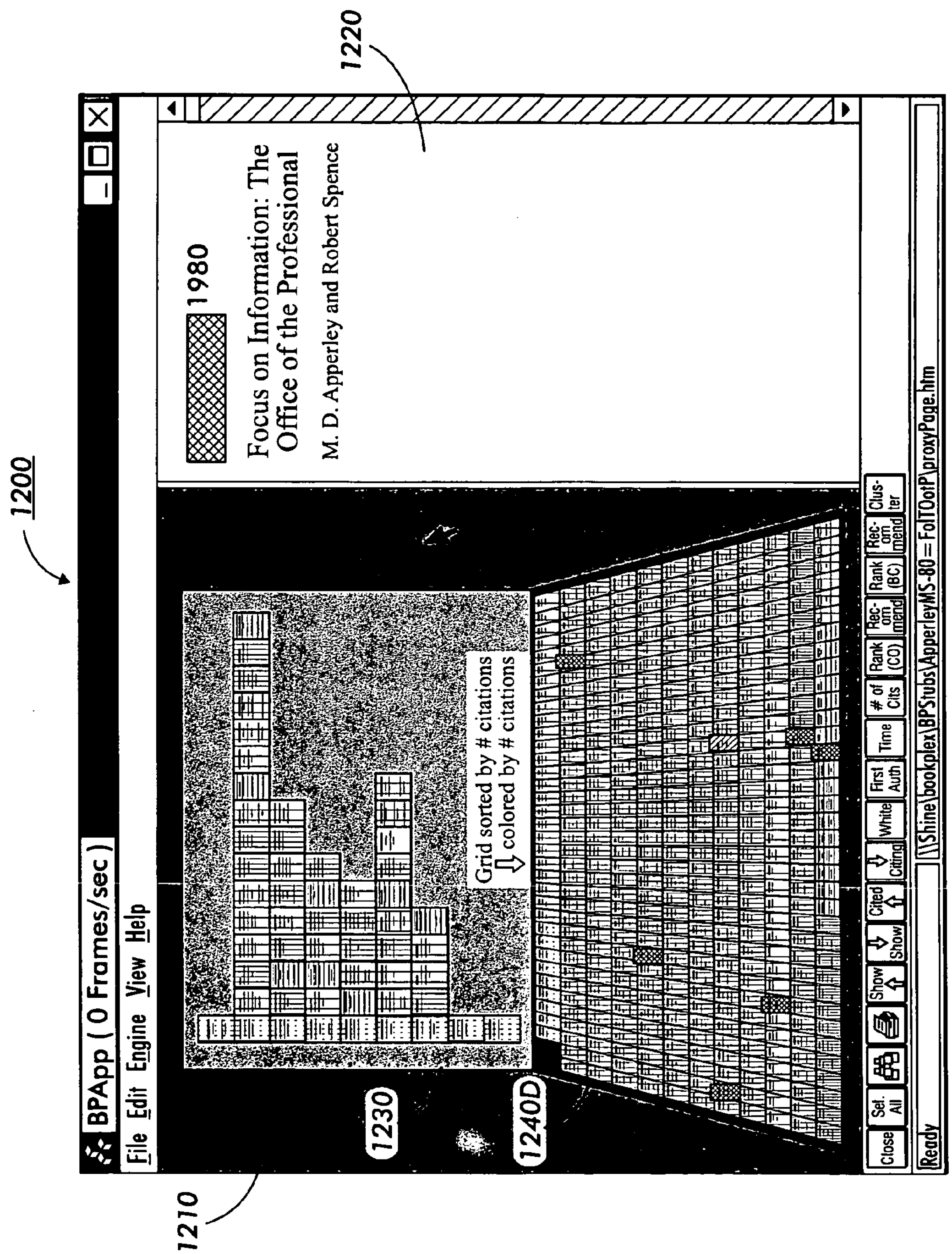

To find articles of high influence, the user can rearrange the citation board by the number of times the reference material is cited. In FIG. 12D shows a rearranged citation board 1240D where the user has rearranged the citation board by the number of times the reference material is cited the source material $CR^0$ (light color is the highest number of citations, dark color is the least). Alternatively, the number of citations in the reference material content $CR^1$ or both the source material content $CR^0$ and $CR^1$ could be illustrated. Here, the user learns that the oldest Spence document was not the most heavily cited because the oldest Spence document was superceded by a later work by Spence.

Figure 12E:
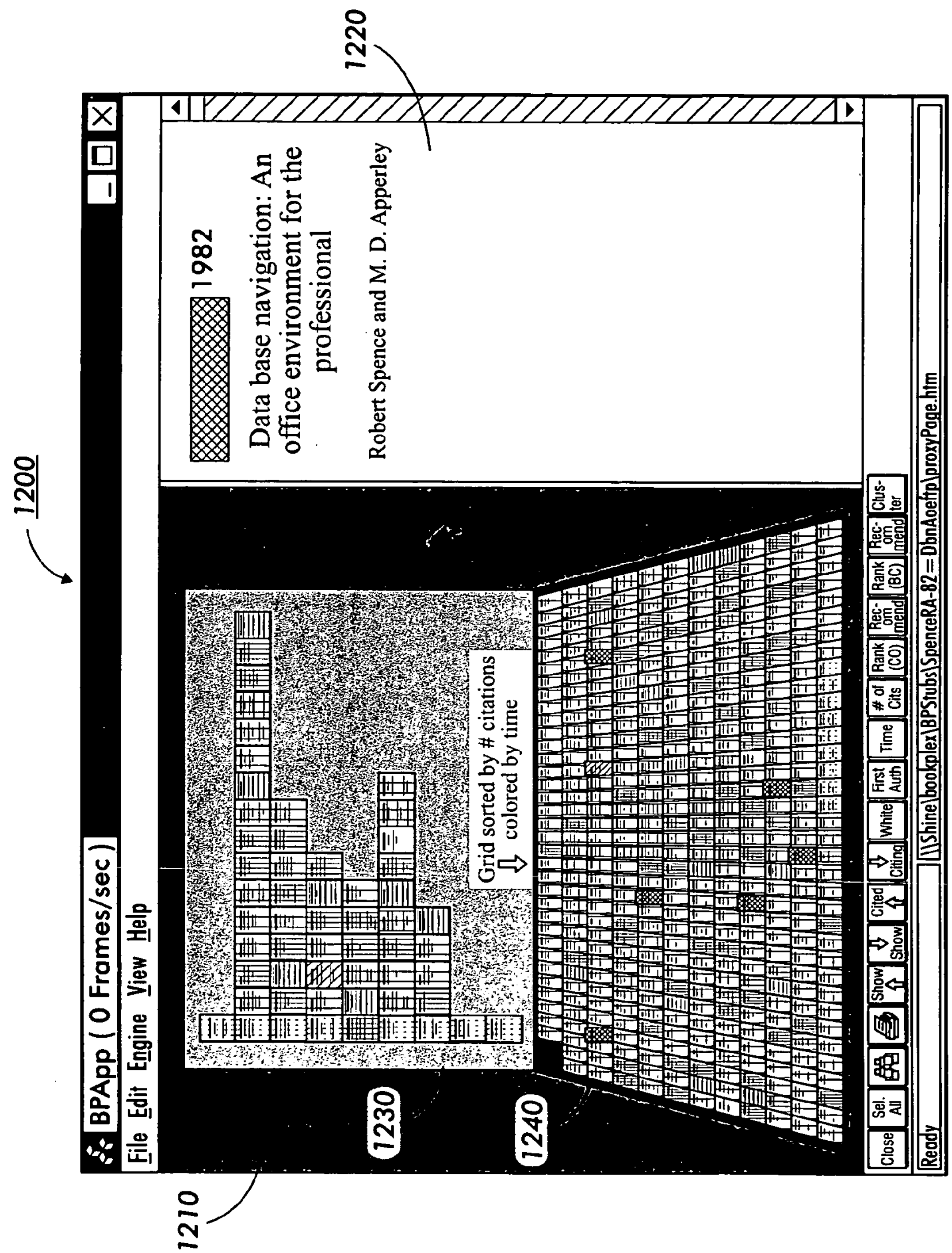
Figure 12F:
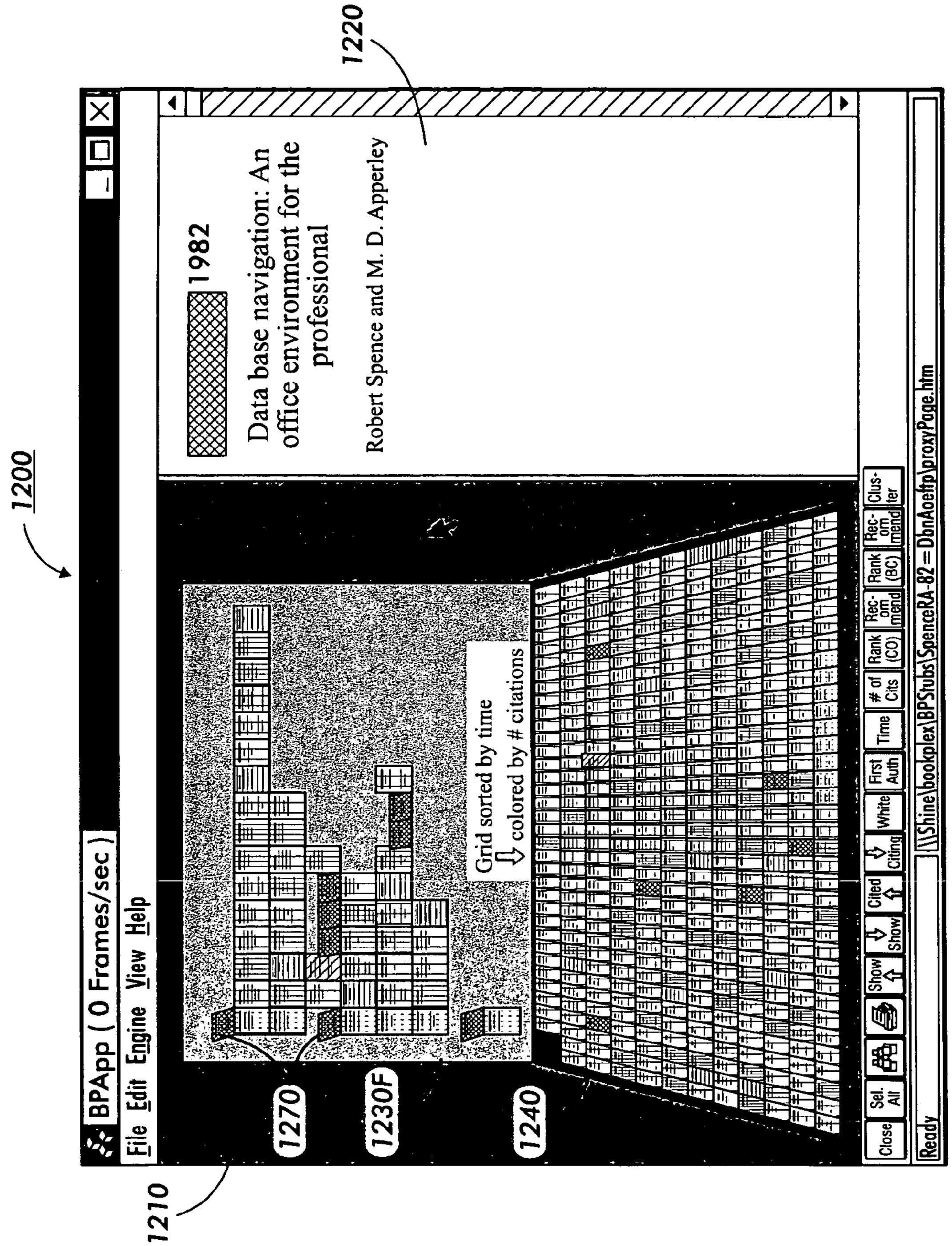
Figure 12G:
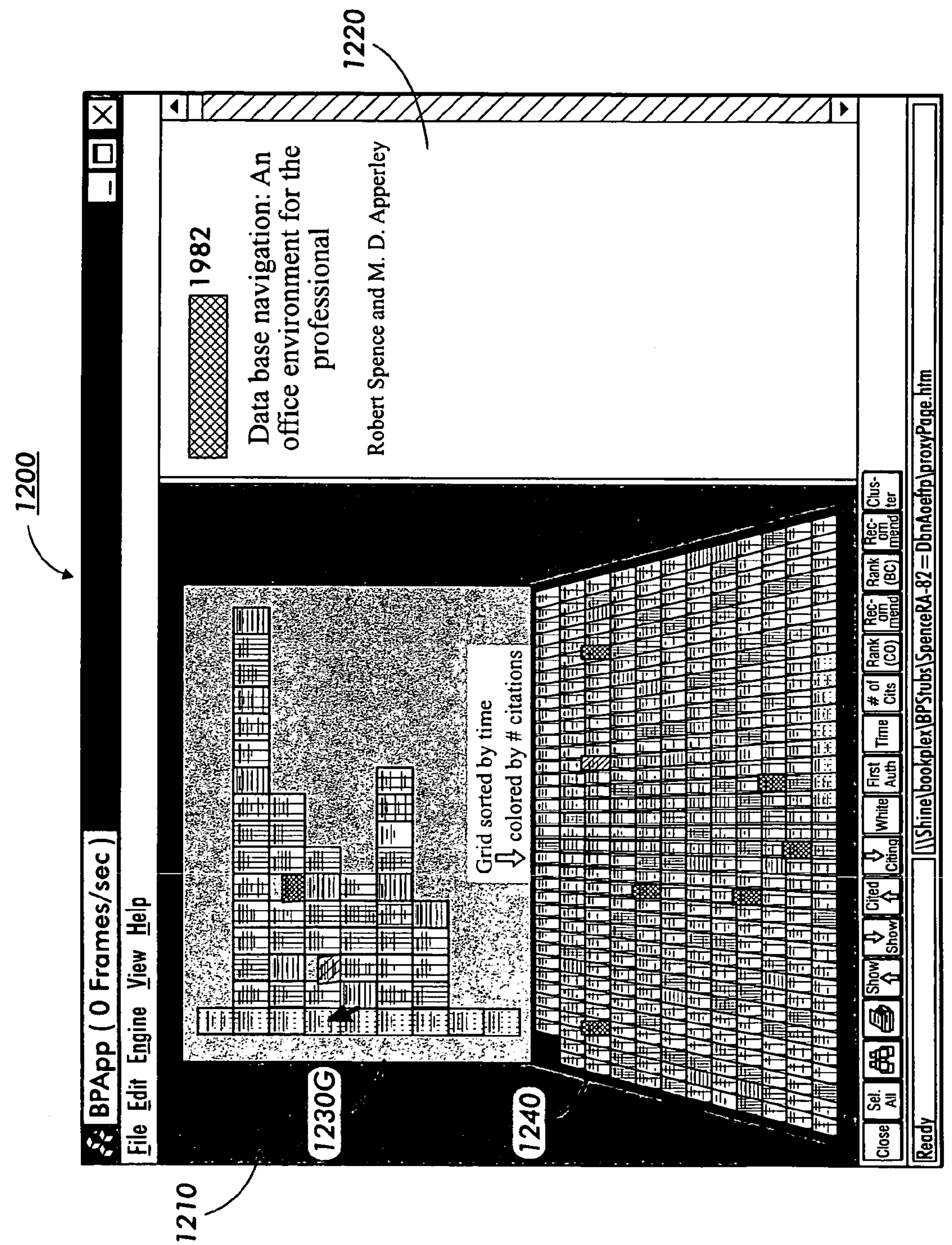

To make the more heavily-cited articles stand out against a background of time, in FIG. 12E, the user selects articles and re-sorts the articles by time with color representing the number of citations. This view shows a user when the most heavily cited articles were created, helping a user to determine when great advances were made in particular field. As shown in FIG. 12F, the user could then initiate a command to display on content board 1230F those articles from the selected Spence articles that can actually be found in the source material. As shown in FIG. 12F, an icon 1270 turns blue and tips forward to show that one of the Spence articles can be found in the source material.

As another line of investigation, the user has the system compute which articles in the content board, and hence in the book, cite a particular article. For example, in FIG. 12G, the user selects the target to be an article by Spence and Apperly. Because of the visualization, the user learns that many materials cite the target article. Since content board 1230G shows that Chapter 4 contains the most citations, a user would like consult Chapter 4 for more information on this topic.

To increase the likelihood that a substantive discussion would occur in a citing material that references the target material, the user can unselect materials without substantive discussion. For example, the user could unselect the left column of content board 1230G, which represents introductions so that only articles are left.

Figure 12H:
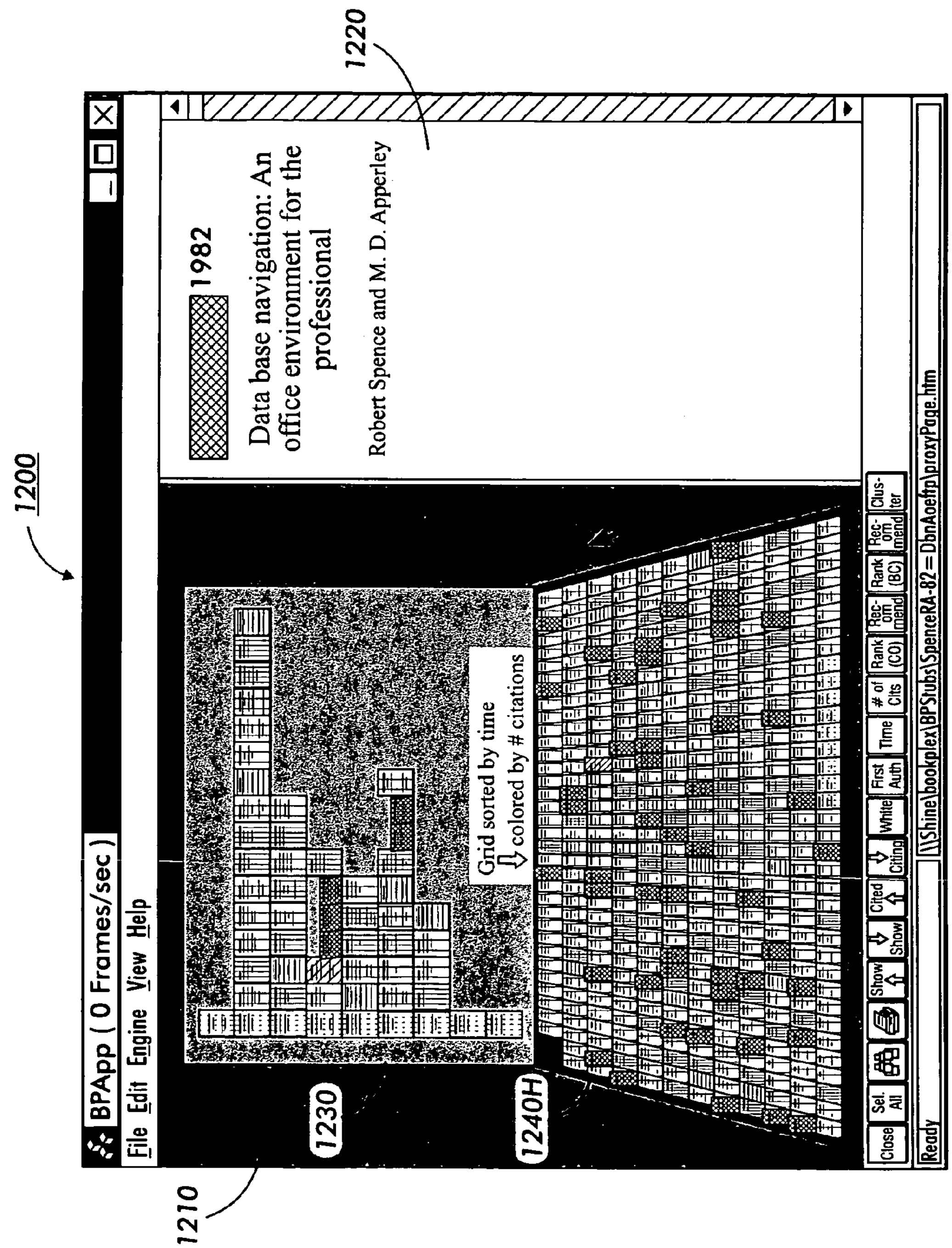

This is shown in content board 1230H of FIG. 12H. Then, to obtain a list of articles related to the Spence and Apperly article, the user commands the citation board 1240H to show all articles that are cited by substantive materials that cite the Spence and Apperly article. The user could then peruse these articles.

Figure 12I:
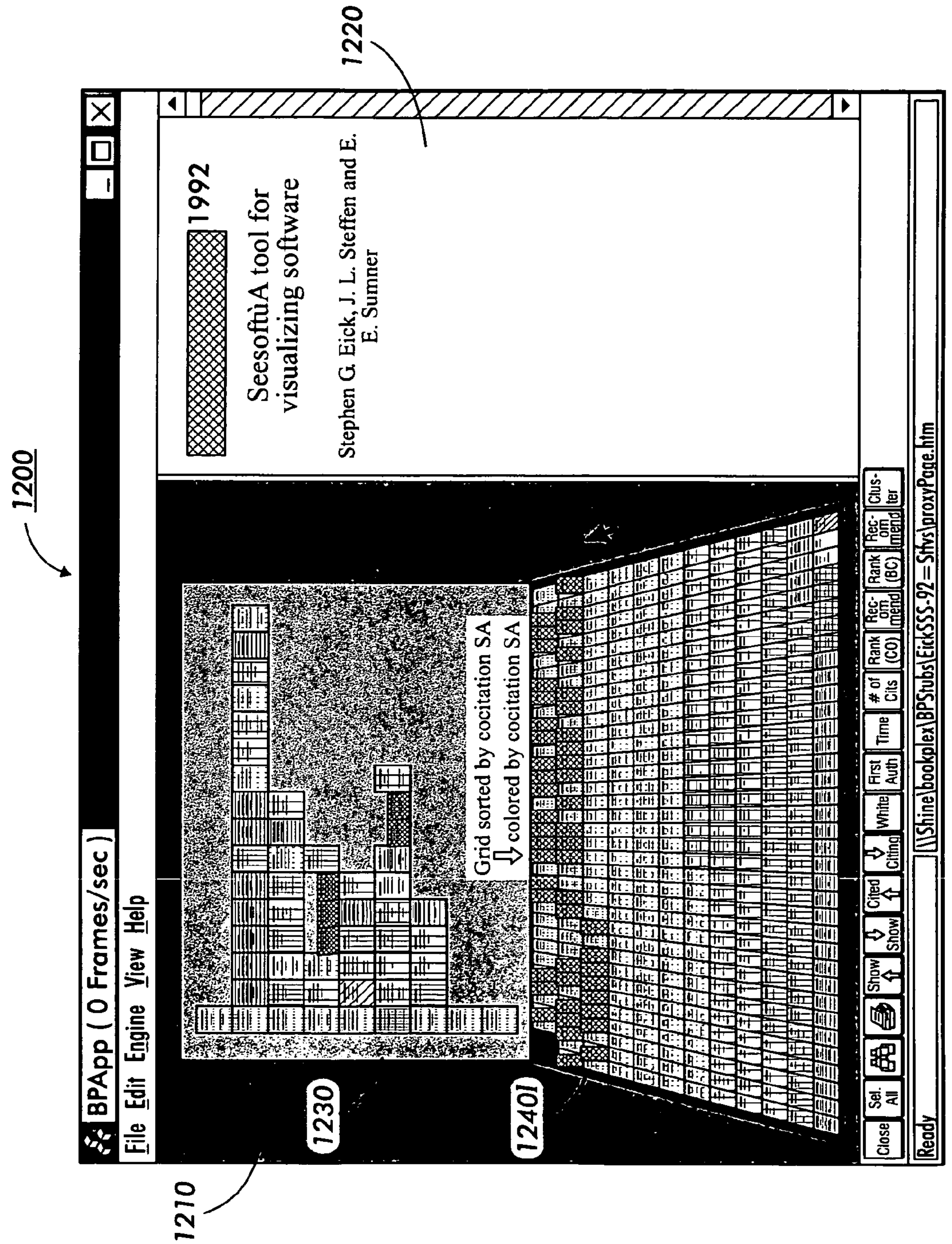
Figure 12J:
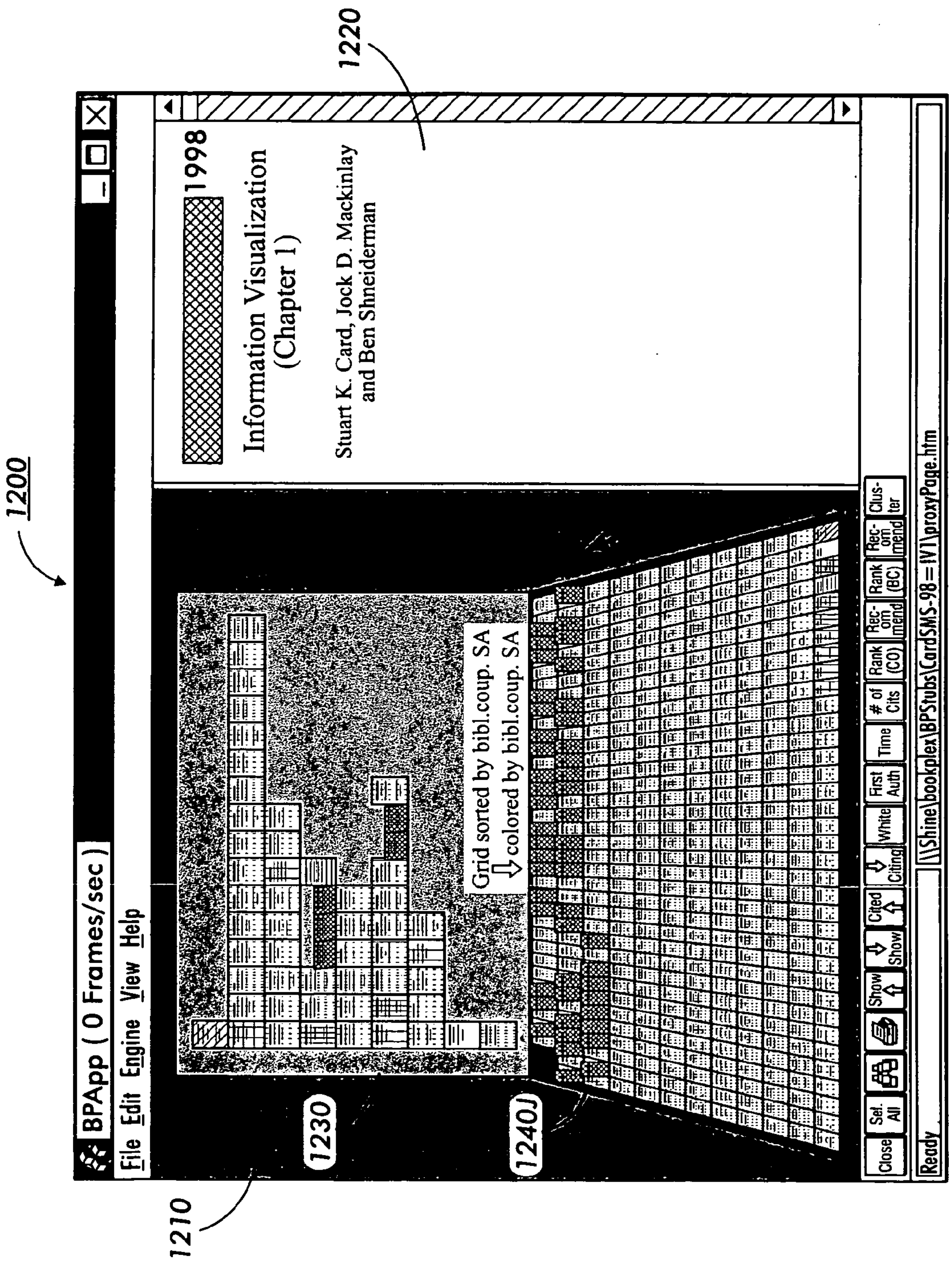

Alternatively, the user interface could highlight the more relevant materials. To find the most relevant materials, the statistical analysis of this routine uses spreading activation on the cocitation matrix of the selected articles to produce an activation value. As shown in FIG. 12I, the materials will then be arranged in the citation board 1240I from right to left, front to back with decreasing values of activation. Also, color could represent different values of activation. The user should peruse the highly-activated articles. A similar view is shown in FIG. 12J, which uses bibliometric coupling for the arrangement in the citation board 1240J.

Figure 12K:
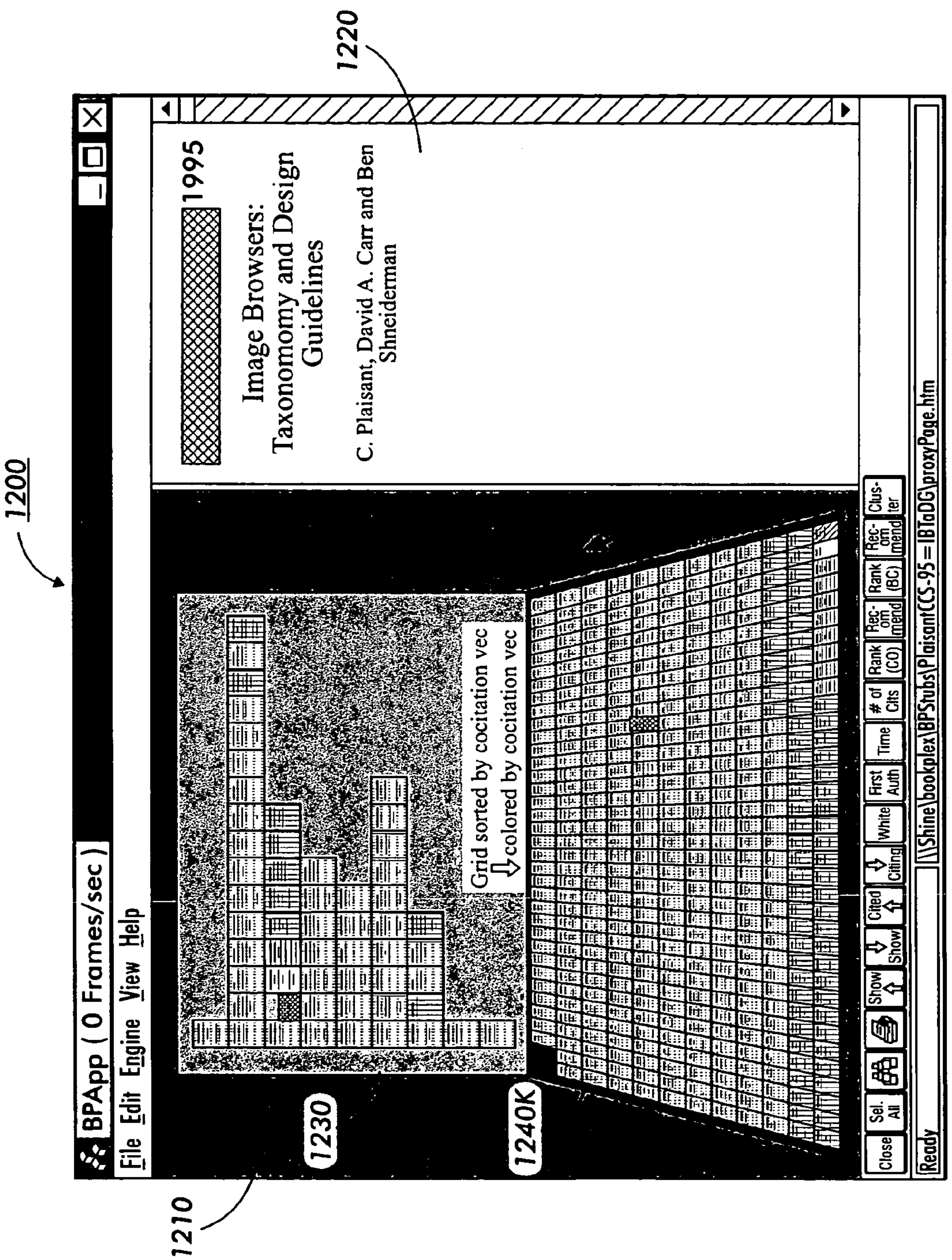

A user can also select a document and the user interface to could recommend a document to read next based on, e.g., spreading activation over the cocitation matrix from that article. In FIG. 12K, the knowledge processing system provides several selections ranked based on relevance using various colors in the arranged citation board 1240K.

D. Conclusion

Systems and methods consistent with principles of the present invention create an electronic medium that is like no other. The medium can be viewed as an enhanced index that is generated using a source material as a seed. The generation of the index extracts information about features of the source material and features of secondary materials related to the source material. One index consistent with the present invention includes selected features of both the source and secondary materials.

In one of its aspects, the index points to a location on a storage medium for the content of secondary material related to a source material. Thereby, this content is available in seconds or minutes. In this regard, while a Web-based medium is within the scope of the present invention, a physical medium, such as a digital video disk (DVD), would have an advantage over the Web-based medium because all of the content could be accessed nearly instantaneously, rather than slower over a typical network connection. Broadband technologies offer the capability to reduce this disadvantage of a Web-based medium.

Because the publication is electronic, the publication overcomes the natural size and weight limitation of books. More importantly, the medium can accelerate a reader's interaction and enable new capabilities not afforded by books. For example, the present invention can provide a user with tools that respond to the user's needs and requests at a level of the collection, rather than just with a single work. This can provide the user with a greater understanding of the collected material and, perhaps, enable the user to create an original work based on the insight amassed during the interaction with the medium.

While there has been illustrated and described what are at present considered to be a preferred implementation and method of the present invention, it will be understood by those skilled in the art that various changes and modifications may be made, and equivalents may be substituted for elements thereof without departing from the true scope of the invention.

Modifications may be made to adapt a particular element, technique, or implementation to the teachings of the present invention without departing from the spirit of the invention. For example, while the previous discussion focused on published books, the present invention could be used to create a medium for a business paper, such as a deposition in a court case. In that case, the user could create from an existing bibliography, from a new work using a digital library, such as a companies accounting database, from workflow, or from any set of initial information, such as business intelligence information.

Similarly, catalogs could be used as source material. Secondary materials and features in catalogs could include technical data, specification sheets, and price lists.

In an academic setting, the medium could add to a student's understanding by providing required readings and all of the research put into the readings. This could help the student gain a better understanding of the material and, perhaps, author new works.

Also, the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM.

Therefore, it is intended that this invention not be limited to the particular implementation and method disclosed herein, but that the invention include all implementations falling within the scope of the appended claims.

What is claimed is:

1. A method of providing an interface for graphically displaying information, comprising:

displaying information regarding a source material and a set of secondary materials on a graphical user interface;

determining a selection of information based on a user input;

analyzing the source material, the set of secondary materials, and the selection of information in a manner that yields relational information between the source material or one or more secondary materials and at least one of the selection of information or the information regarding the source materials; and updating the display of information regarding the source material and the set of secondary materials, wherein said display of information is graphically implemented via change in graphical indicia on a virtual board such that one or more representations of information relating to at least one of the source material or the secondary materials are capable of graphical rearrangement as a function of the relational information.

2. The method according to claim 1, wherein the updating step highlights a particular set of secondary materials, so as to bring the particular set of the secondary materials to the attention of the user.

3. The method according to claim 1, wherein the displaying step includes displaying a representation of objects of the source material in a first area and displaying representations of objects of the second materials in a second area.

4. The method according to claim 3, wherein the updating step rearranges the locations of the representations of the objects of the secondary materials.

5. The method according to claim 3, further comprising the step of:

linking the first area and the second area so that a user input to either area will effect the display in the other area.

6. An interface for graphically displaying information, comprising:

a display that displays information regarding a source material and a set of secondary materials;

a user interface that determines a selection of information using a user input and performs an analysis based on the source material, the set of secondary materials, and the selection of information, wherein the analysis yields relational information between the source material or one or more secondary materials and at least one of the selection of information or the information regarding the source materials; and a controller that instructs the display of information regarding the source material and set of secondary materials to be updated via change in graphical indicia on a graphically-displayed virtual board on the user interface such that one or more representations of information relating to at least one of the source material or the secondary materials are capable of graphical rearrangement as a function of the relational information.

7. The interface according to claim 6, wherein the display includes a first area that displays a representation of objects of the source material and second area that displays representations of objects in the second material.

8. The interface according to claim 7, wherein the controller instructs the display to rearrange the locations of the representations of the objects of the secondary materials.

9. The interface according to claim 7, wherein the controller links the first area and the second area so that a user input to either area will effect the display in the other area.

10. A computer-readable medium containing instructions for controlling a computer to perform a method for providing an interface for graphically displaying information, comprising:

displaying information regarding a source material and set of secondary materials;

determining a selection of information based on a user input;

analyzing the source material, the set of secondary materials, and the selection of information in a manner that yields relational information between the source material or one or more secondary materials and at least one of the selection of information or the information regarding the source materials; and updating the display of information regarding the source material and set of secondary materials via change in graphical indicia on a on a graphically-displayed virtual board on the user interface such that one or more representations of information relating to at least one of the source material or the secondary materials are capable of graphical rearrangement as a function of the relational information.

11. A method of producing a storage medium that provides information related to a source material, comprising the steps of:

gathering features of the source material;

accessing secondary materials related to the features;

gathering features of the secondary materials;

determining attributes of the gathered materials, wherein the source material, the features of the source material, the secondary materials, the feature of the secondary materials, and the attributes of the gathered materials are characterized as objects of the storage medium;

analyzing the attributes based on a characteristic; and generating an extended document capable of variable electronic dissemination as a function of the analysis, wherein the storage medium includes previously generated and pre-stored relational information between the objects of the storage medium that is adapted to be graphically depicted and rearranged as a function of the pre-stored relational information and user input on a graphically-depicted virtual board displayed on a user interface.

12. The method of claim 11, wherein the relational information includes a database of linkages between the objects of the storage medium.

13. The method of claim 12, wherein the hierarchy of the linkage database of the extended document is adapted to be displayed via graphical indicia.

14. The method of claim 12, wherein a citation matrix is derived from the database of linkages between the objects and the storage medium.

15. The method of claim 12, wherein a cocitation matrix is derived from the database of linkages between the objects and the storage medium.

16. The method of claims 11, wherein the extended document is adapted to be displayed via graphical indicia such that selection of a desired relational quality by the user causes the display to graphically indicate which objects or content shares the same relation with the source material.

17. The method of claim 11, further comprising the step of recommending secondary materials based on a selection of relational information by a user.

18. The method of claim 11, further comprising the step of performing a spreading activation procedure to provide information from the storage medium for inclusion into the extended document.

19. The method of claim 11, wherein the relational information is specified as a certain level of relationship between the provided information and the source material.

20. A method of producing a storage medium that provides information related to a source material, comprising the steps of:

gathering features of the source material;

accessing secondary materials related to the features;

determining attributes of the secondary materials, wherein the source material, the features of the source material, the secondary materials, and the attributes of the secondary materials can be objects of the storage medium;

creating a matrix that indicates relationships between each secondary material or attribute and one or both of the source material or the feature of the source material; and generating the storage medium in a format capable of variable electronic dissemination as a function of the analysis, the storage medium including previously generated and pre-stored relational information related to the source material and a database of linkages between the objects of the storage medium;

wherein the relational information is adapted to be graphically depicted and rearranged as a function of the pre-stored relational information and user input on a user interface.

21. The method of claim 20, wherein the relational information related to the source material is determined as a function of a spreading activation procedure.

22. The method of claim 21, wherein the spreading activation procedure is executed as a function of the level of relationship between the provided information and the source material.

23. The method of claim 20 wherein the extended document is provided as a function of similarity between the information related to the source material and the source material.

24. The method of claim 23, wherein the similarity is determined based on the level of relationship between the information related to the source material and the source material.

25. The method of claim 20, wherein the information related to the source material includes relational information between the source material or one or more of the secondary materials and at least one of the gathered features, the determined attributes or the predetermined characteristic, and wherein the relational information is used in the provision of the information contained within the storage medium.

* * * * *